United States Patent
Rusek et al.

(10) Patent No.: US 11,336,338 B2
(45) Date of Patent: May 17, 2022

(54) METHOD AND APPARATUS FOR SELECTING MODE A/B FOR BEAM/POLARIZATION MIMO COMMUNICATION

(71) Applicant: Sony Corporation, Tokyo (JP)

(72) Inventors: Fredrik Rusek, Lund (SE); Olof Zander, Lund (SE); Erik Bengtsson, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 17/266,185

(22) PCT Filed: Aug. 7, 2019

(86) PCT No.: PCT/US2019/045513
§ 371 (c)(1),
(2) Date: Feb. 5, 2021

(87) PCT Pub. No.: WO2020/033551
PCT Pub. Date: Feb. 13, 2020

(65) Prior Publication Data
US 2021/0297120 A1    Sep. 23, 2021

(30) Foreign Application Priority Data

Aug. 8, 2018    (SE) .................................. 1830234-9

(51) Int. Cl.
*H04B 7/04* (2017.01)
*H04B 7/0452* (2017.01)
*H04B 7/06* (2006.01)

(52) U.S. Cl.
CPC ......... *H04B 7/0452* (2013.01); *H04B 7/0689* (2013.01)

(58) Field of Classification Search
CPC .. H04B 7/0452; H04B 7/0689; H04B 7/0413; H04L 1/0023
See application file for complete search history.

(56) References Cited

U.S. PATENT DOCUMENTS

2008/0247488 A1    10/2008  Li et al.
2010/0323753 A1    12/2010  Imamura et al.
(Continued)

OTHER PUBLICATIONS

International Search Report and Written Opinion from corresponding International Application No. PCT/US2019/045513, dated Oct. 7, 2019, 13 pages.

*Primary Examiner* — Rahel Guarino
(74) *Attorney, Agent, or Firm* — Tucker Ellis LLP

(57) ABSTRACT

Systems and methods for selecting a communication mode in a wireless network (10) include a communication mode selection procedure that may be carried out by the respective devices in an automated manner to identify a mode for communication between an electronic device (14) and a network node (12). The selection may be between P-MIMO Mode A, P-MIMO Mode B, B-MIMO Mode A, or B-MIMO Mode B. Determining the desired mode for communication is based on the ability and/or desirability of the network node (12) to efficiently process a maximum threshold number of electronic devices using the P-Mimo Mode A or B-MIMO Mode A and, thereafter, granting MIMO Mode B communication access to any subsequent electronic devices joining the communication network. Communication mode selection may occur dynamically based on changing channel conditions caused by mobility of the electronic user equipment devices and what overlapping and/or non-overlapping beams are needed to be used.

10 Claims, 7 Drawing Sheets

(56) References Cited

U.S. PATENT DOCUMENTS

2014/0071912 A1 3/2014 Hou et al.
2018/0019818 A1* 1/2018 Yu .................... H04B 10/25753

* cited by examiner

METHOD AND APPARATUS FOR SELECTING MODE A/B FOR BEAM/POLARIZATION MIMO COMMUNICATION

TECHNICAL FIELD OF THE INVENTION

The technology of the present disclosure relates generally to wireless communications among electronic devices in a network environment and, more particularly, to a method and apparatus for selecting a mode of millimeter-wave Multiple Input Multiple Output (B-MIMO) communication.

BACKGROUND

Demand for data traffic on wireless communication systems continues to increase. Since widespread commercialization of fourth generation (4G) wireless systems, such as a Long Term Evolution (LTE) system or an LTE-Advanced (LTE-A) system standardized by the 3rd Generation Partnership Project (3GPP), next generation wireless systems are being developed. One such system, by the 3GPP, is a fifth generation (5G) or New Radio (NR) wireless system.

To meet demand for higher data rates, wireless systems anticipate using presently unlicensed spectrum bands. High frequency bands (e.g. millimeter wave) can provide high data rates, but signal power may decrease quicker as signals propagate as compared to lower band systems. To provide a wider coverage area, beamforming techniques may be utilized at both a base station (BS) side and at a user equipment (UE) side.

Polarization based MIMO (P-MIMO), also known as polarization multiplexing, can potentially double the data rate with no additional control/signaling overhead. Certain P-MIMO transmission techniques have been proposed and shown to deliver good results in favorable channel conditions, e.g., strong line of sight channel or channels with a dominant propagation direction. However, line of sight channels cannot be guaranteed in either indoor or outdoor environments, and high mobility use cases.

In P-MIMO, the UE transmits N (for example two) data symbols onto a corresponding N (two in the example) beams that have the same direction, but different polarization. The assignment of symbols to beams is arbitrary.

P-MIMO can be operated in P-MIMO Mode-A and P-MIMO Mode-B. In P-MIMO Mode-B, the UE needs to address the BS-beams as defined by the BS, hence with the polarization rotated to fit the coordinate system of the BS. This may not always be optimal and increases the precoding burden on the UE. In P-MIMO Mode-A the UE may also transmit according to its own polarization planes such as for example by transmitting one stream in each of its polarizations, or according to the strongest eigenmodes of this limited system, which may result in being something in-between. In P-MIMO Mode-A, however, the BS needs to co-process the signals it receives in its polarizations, which renders some additional burden onto the BS relative to operation in the P-MIMO Mode B.

In Beam MIMO (B-MIMO), on the other hand, the UE transmits M data symbols onto M beams pointing in different directions, and with one polarization per beam. The M beams pointing in different directions provides in Beam MIMO M choices for symbol assignment. In Beam MIMO Mode A, the M data streams are sent in all of the directions. In Beam MIMO Mode B, one data stream is sent on one beam and the other data stream is sent on the other beam, and so in turn for each of the M beams.

For ease of description and illustration it will be assumed that, in the Beam MIMO, the UE transmits two data symbols onto two beams pointing in different directions, and with one polarization per beam. The two beams pointing in different directions provides in Beam MIMO two choices for symbol assignment. In Beam MIMO Mode A, both data streams are sent in both directions. In Beam MIMO Mode B, one data stream is sent on one beam and the other data stream is sent on the other beam. It is to be appreciated, however, that the UE may transmit any arbitrary number M data symbols onto M beams pointing in different directions, and with one polarization per beam, and that the present disclosure is not limited to the example embodiment of two data symbols being transmitted by the UE onto two beams pointing in different directions.

For further ease of description and illustration it will be assumed that UE transmissions to the BS and/or communications from the UE to the BS are "uplink" transmissions and/or communications, and conversely that BS transmissions to the UE and/or communications from the BS to the UE are "downlink" transmissions and/or communications. The embodiments herein relate to uplink transmissions, communications and protocol selection.

In general, P-MIMO Mode communication is slightly suboptimal relative to B-MIMO communication, and B-MIMO Mode B communication is slightly suboptimal relative to B-MIMO Mode A communication. As a result, all UEs prefer to communicate with the BSs using Beam MIMO Mode A communication, if possible, since it leads to higher capacity. But all UEs using Beam MIMO Mode A communication cannot always be accommodated by the BS since decoding complexity can grow exponentially with Beam Mode A. That is, unrestricted usage of mode A leads to exponential BS processing complexity. A typical BS has a number of beams that it uses for receiving the signals from the multiple UEs. The BS collects the signals across all its beams and performs a MIMO detection to retrieve the symbols. The MIMO detection is of exponential complexity in the number of involved symbols. However, one BS beam can be used to receive signals from multiple UEs, and this may lead to a trellis structure among the symbols, rendering enormous complexity.

In view of the above, there is a need in the art for methods, devices, and systems that can limit, restrict or otherwise control the number of UEs that are able to utilize Polarization and/or Beam MIMO Mode A communication with a BS.

SUMMARY

The disclosed approach relates generally to wireless communications among electronic devices in a network environment and, more particularly, to a method and apparatus for selecting a mode of millimeter-wave beam Multiple Input Multiple Output (B-MIMO) uplink communication. Methods and apparatus are disclosed for selecting Mode A/B for Polarization and/or Beam MIMO uplink communication.

In accordance with an example embodiment, a method is provided for controlling a Multiple Input Multiple Output (MIMO) Mode of uplink communication between a network node and a first electronic device. In accordance with a particular example embodiment, a method is provided for controlling a P-MIMO Mode of uplink communication between a network node and a first electronic device. In accordance with a further particular example embodiment, a method is provided for controlling a B-MIMO Mode of uplink communication between a network node and a first electronic device. The network node may be, for example, a base station (BS), and a first electronic device which may be, for example, a user equipment (UE) device such as, for example, a portable phone. The network node communicates with a plurality of electronic devices other than the first electronic device using one or more generic uplink MIMO communication protocol(s).

Method, Primary Embodiment

In accordance with a first example embodiment, a method is provided for controlling a MIMO Mode of uplink communication between a network node in a communication network comprising a plurality of electronic devices and a first electronic device. The method may control a P-MIMO Mode of uplink communication between the network node and the first electronic device, it may control a B-MIMO Mode of uplink communication between the network node and the first electronic device, and/or it may control both P-MIMO and B-MIMO Modes of uplink communication between the network node and the first electronic device. For convenience of discussion and ease of description, however, the example embodiments will be described in connection with control of B-MIMO Modes of uplink communication. It is to be appreciated however that the embodiments are not limited to control of only Beam MIMO, or of only Polarization MIMO, but rather apply equivalently to any other forms of multiple input multiple output uplink communication protocols for uplink transmissions, communications, and the like, now know or hereinafter developed.

The network node may communicate with at least one electronic device of the plurality of electronic devices other than the first electronic device using an uplink MIMO communication protocol. The MIMO communication mode of the at least one electronic device of the plurality of electronic devices may be any arbitrary communication mode such as for example P-MIMO Mode A, P-MIMO Mode B, B-MIMO Mode A, and/or B-MIMO Mode B. In the first example embodiment, the network node determines a B-MIMO Mode A capability of the first electronic device. Responsive to determining the B-MIMO Mode A capability of the first electronic device, the network node selectively determines a desirability and/or an ability of the network node to service the uplink communication between the network node and the first electronic device using the B-MIMO Mode A communication protocol together with servicing the uplink communicating with the at least one electronic device of the plurality of electronic devices other than the first electronic device using the one or more arbitrary uplink MIMO communication protocol(s). Based on the network node determining the B-MIMO Mode A capability of the first electronic device, and the network node determining the desirability and/or ability of the network node to service the uplink communication between the network node and the first electronic device using the B-MIMO Mode A communication protocol, the network node transmits a first uplink B-MIMO communication mode selection command signal to the first electronic device for controlling the B-MIMO mode of uplink communication between the network node and the first electronic device. In the example embodiment, the first uplink B-MIMO communication mode selection command signal specifies that the first electronic device is to use the B-MIMO Mode A communication protocol. Thereafter, the network node communicates with the first electronic device using the uplink B-MIMO Mode A communication protocol.

In the example embodiment the network node may determine B-MIMO Mode A capability of the first electronic device in several ways. In one example, the network node may determine the B-MIMO Mode A capability of the first electronic device by receiving a first communication capabilities signal from the first electronic device. The first communication capabilities signal may be communicated between the first electronic device and the network node on a selected dedicated communication channel between the first electronic device and the network node, for example. The first communication capabilities signal specifies a B-MIMO communication mode capability of the first electronic device as either the B-MIMO Mode A capability for communicating by the first electronic device with the network node using the B-MIMO Mode A communication protocol or as the B-MIMO Mode B capability for communicating by the first electronic device with the network node using a B-MIMO Mode B communication protocol. In the example embodiment, the network node determines the B-MIMO Mode A capability of the first electronic device based on the B-MIMO communication mode capability specified by the first communication capabilities signal. In addition and/or alternatively, the network node may determine the B-MIMO Mode A capability of the first electronic device by determining a manufacturer brand of the first electronic device. In further addition and/or alternatively, the network node may determine the B-MIMO Mode A capability of the first electronic device by determining a manufacturer-assigned model number of the first electronic device. In still further addition and/or alternatively, the network node may determine the B-MIMO Mode A capability of the first electronic device by determining a manufacturer-assigned release specification of the first electronic device. In still yet further addition and/or alternatively, the network node may determine the B-MIMO Mode A capability of the first electronic device by determining a default support capability of the first electronic device.

The network node might not always choose the communication protocol for communication with the first electronic device to be Mode A. In this regard and responsive to determining the B-MIMO Mode A capability of the first electronic device, the network node may determine an undesirability and/or an inability to service the uplink communication between the network node and the first electronic device using the B-MIMO Mode A communication protocol together with servicing the uplink communicating with the at least one electronic device of the plurality of electronic devices other than the first electronic device using the one or more generic MIMO communication protocol(s). In this case and based on the determined undesirability and/or inability of the network node to service the uplink communication between the network node and the first electronic device using the B-MIMO Mode A communication protocol, the network node transmits a second B-MIMO communication mode selection command signal to the first electronic device for controlling the B-MIMO mode of communication between the network node and the first electronic device. The second B-MIMO communication mode selection command signal specifies that the first electronic device is to use the B-MIMO Mode B communication protocol. The network node and the first electronic device then may communicate using the B-MIMO Mode B communication protocol.

The network node may determine the desirability to communicate with first B-MIMO Mode A capable electronic devices using the B-MIMO Mode A communication protocol by one or more of determining the manner in which the UEs are distributed over communication broadcast beams of the BS, and/or determining the BS processing total load/ performance, or by other means. The desirability to communicate using the B-MIMO Mode A may be based on a distribution of beams of the network node relative to the user electronic devices, and may also be based on overhead determinations for the network node taking on the UE in the B-MIMO Mode A. With regard to the beam distribution approach to the communication mode determination, the network node may determine a distribution of the user electronic device of a plurality of electronic devices other than the first user electronic device over communication beams of the network node. The network node may determine a beam distribution servicing overhead for communicating with the network node using the B-MIMO Mode A communication protocol together with the communicate a quantity of electronic devices other than the first electronic device using the generic MIMO communication protocol(s). The network node may determine the beam distribution servicing overhead being less than a predetermined overhead threshold wherein it is desirable to use the B-MIMO Mode A.

With regard to the performance or load processing capability approach to the communication mode determination, the network node may determine the desirability and/or ability based on performance or load processing capability by determining a communication processing capacity of the network node not exceeding a communication processing burden of the network node communicating using the B-MIMO Mode A communication protocol with the first electronic device and with the at least one electronic device other than the first electronic device using the MIMO communication protocol. The network node may determine the performance or load processing capability of the network node being greater than a predetermined performance or load processing capability threshold wherein it is desirable to use the B-MIMO Mode A.

The load status of communication channels may be used for the Mode determination. The network node may determine a condition of one or more communication channels used for the communicating by the network node with the at least one electronic device of a plurality of electronic devices other than the first electronic device using the MIMO communication protocol. The network node may selectively determine the desirability of the network node to communicate with the first electronic device using the B-MIMO Mode A communication protocol based on the condition of the one or more communication channels.

Method, Alternative Embodiment

In accordance with a further example embodiment, a method of controlling a P- and/or B-MIMO Mode of uplink communication between a network node in a communication network comprising a plurality of electronic devices and a first electronic device is provided. For convenience of discussion and ease of description, the example embodiments will be described in connection with control of B-MIMO Modes of uplink communication. It is to be appreciated however that the embodiments are not limited to control of only Beam MIMO, or of only Polarization MIMO, but rather apply equivalently to any other forms of multiple input multiple output uplink communication protocols now know or hereinafter developed.

The network node may communicate with at least one electronic device of the plurality of electronic devices other than the first electronic device using one or more generic MIMO communication protocol(s), and may receive a first communication capabilities signal from the first electronic device. In the example embodiment, the first communication capabilities signal specifies or otherwise announces to the network node a B-MIMO communication mode capability of the first electronic device as either a B-MIMO Mode A capability for communicating by the first electronic device with the network node using the B-MIMO Mode A communication protocol or a B-MIMO Mode B capability for communicating by the first electronic device with the network node using a B-MIMO Mode B communication protocol. The MIMO communication mode of the at least one electronic device of the plurality of electronic devices may be any arbitrary communication mode such as for example P-MIMO Mode A, P-MIMO Mode B, B-MIMO Mode A, and/or B-MIMO Mode B. The network node determines the B-MIMO Mode A capability of the first electronic device based on the B-MIMO communication mode capability specified by the first communication capabilities signal and, responsive to determining the B-MIMO Mode A capability of the first electronic device, the network node determines a desirability and/or an ability of the network node to service the uplink communication between the network node and the first electronic device using the B-MIMO Mode A communication protocol together with servicing the uplink communicating with the at least one electronic device of the plurality of electronic devices other than the first electronic device using the MIMO communication protocol(s). In addition in the example embodiment and based on the determining by the network node the B-MIMO Mode A capability of the first electronic device and based also on the determining by the network node the ability of the network node to service the uplink communication between the network node and the first electronic device using the B-MIMO Mode A communication protocol, the network node may transmit a first B-MIMO communication mode selection command signal to the first electronic device for controlling the B-MIMO mode of communication between the network node and the first electronic device, wherein the first B-MIMO communication mode selection command signal specifies or otherwise commands or permits the first electronic device to use the B-MIMO Mode A communication protocol.

Thereafter, the network node may communicate with the first electronic device using the B-MIMO Mode A communication protocol, and may further communicate or continue communicating with the at least one electronic device of a plurality of electronic devices other than the first electronic device using the one or more MIMO communication protocol(s).

Further in accordance with the example embodiment, responsive to determining the B-MIMO Mode A capability of the first electronic device, the network node may determine an undesirability and/or an inability to service the uplink communication between the network node and the first electronic device using the B-MIMO Mode A communication protocol together with servicing the uplink communicating with the at least one electronic device of a plurality of electronic devices other than the first electronic device using the MIMO communication protocol(s). The network node may, based on the determining the B-MIMO Mode A capability of the first electronic device and the determining the undesirability and/or the inability of the network node to service the uplink communication between the network node and the first electronic device using the B-MIMO Mode A communication protocol, transmit a second B-MIMO communication mode selection command signal to the first electronic device for controlling the B-MIMO mode of communication between the network node and the first electronic device. The second B-MIMO communication mode selection command specifies or otherwise commands or permits the first electronic device to use the B-MIMO Mode B communication protocol rather than the B-MIMO Mode A communication protocol.

Thereafter, the network node may communicate with the first electronic device using the B-MIMO Mode B communication protocol, and may further communicate or continue communicating with the at least one electronic device of a plurality of electronic devices other than the first electronic device using the one or more generic MIMO communication protocol(s).

Method, Further Alternative Embodiment

In accordance with a further example embodiment, a method is provided for controlling a P- and/or B-MIMO Mode of uplink communication between a network node in a communication network comprising a plurality of electronic devices and a first electronic device. For convenience of discussion and ease of description, the example embodiments will be described in connection with control of B-MIMO Modes of uplink communication. It is to be appreciated however that the embodiments are not limited to control of only Beam MIMO, or of only Polarization MIMO, but rather apply equivalently to any other forms of multiple input multiple output uplink communication protocols now know or hereinafter developed.

The network node may communicate with at least one electronic device other than the first electronic device of the plurality of electronic devices other than the first electronic device using one or more MIMO communication protocol(s). The MIMO communication mode of the at least one electronic device of the plurality of electronic devices may be any arbitrary communication mode such as for example P-MIMO Mode A, P-MIMO Mode B, B-MIMO Mode A, and/or B-MIMO Mode B. The network node may receive a first communication request signal from the first electronic device, wherein the first communication request signal specifies a communication mode selection request indicating a request for communicating by the first electronic device with the network node, and a preference by the first electronic device to use the B-MIMO Mode A communication protocol over or relative to a B-MIMO Mode B communication protocol. Responsive to receiving the communication mode selection request, the network node selectively determines a desirability and/or an ability of the network node to communicate with the first electronic device using the B-MIMO Mode A communication protocol. The network node transmits a first communication grant signal from the network node to the first electronic device in accordance with the desirability and/or ability of the network node to communicate with the first electronic device using the B-MIMO Mode A communication protocol. In the further example embodiment, the first grant signal specifies a first communication mode selection grant indicating a grant by the network node to the first electronic device for the first electronic device to communicate with the network node using the B-MIMO Mode A communication protocol.

Thereafter, the network node may communicate with the first electronic device using the B-MIMO Mode A communication protocol, and may further communicate or continue communicating with the at least one electronic device of a plurality of electronic devices other than the first electronic device using the one or more MIMO communication protocol(s).

Further in accordance with the example embodiment, responsive to receiving the communication mode selection request, the network node selectively determines an undesirability and/or an inability of the network node to communicate with the first electronic device using the B-MIMO Mode A communication protocol. The network node may transmit a second communication grant signal from the network node to the first electronic device in accordance with the undesirability and/or an inability of the network node to communicate with the first electronic device using the B-MIMO Mode A communication protocol. In the further example embodiment, the second grant signal specifies a second communication mode selection grant indicating a grant by the network node to the first electronic device for the first electronic device to communicate with the network node using the B-MIMO Mode B communication protocol.

Thereafter, the network node may communicate with the first electronic device using the B-MIMO Mode B communication protocol, and may further communicate or continue communicating with the at least one electronic device of a plurality of electronic devices other than the first electronic device using the one or more MIMO communication protocol(s).

System, Primary Embodiment

In accordance with a further example embodiment, a network node is provided. The network node is operable to control a P- and/or B-MIMO Mode of uplink communication over a communication channel between a network node and a first electronic device. For convenience of discussion and ease of description, the example embodiments will be described in connection with control of B-MIMO Modes of uplink communication. It is to be appreciated however that the embodiments are not limited to control of only Beam MIMO, or of only Polarization MIMO, but rather apply equivalently to any other forms of multiple input multiple output uplink communication protocols now know or hereinafter developed.

In the embodiment, the network node preferably comprises an antenna arrangement and a control circuit comprising a processor and a memory. The control circuit is coupled with the antenna arrangement and is operable to communicate with at least one electronic device of a plurality of electronic devices other than the first electronic device using an uplink MIMO communication protocol. The MIMO communication mode of the at least one electronic device of the plurality of electronic devices may be any arbitrary communication mode such as for example P-MIMO Mode A, P-MIMO Mode B, B-MIMO Mode A, and/or B-MIMO Mode B. The control circuit is further operable to determine a B-MIMO Mode A capability of the first electronic device. Responsive to determining the B-MIMO Mode A capability of the first electronic device, the control circuit selectively determines desirability and/or an ability of the network node to service the uplink communication between the network node and the first electronic device using the B-MIMO Mode A communication protocol together with servicing the uplink communicating with the at least one electronic device of the plurality of electronic devices other than the first electronic device using the one or more MIMO communication protocol(s). The control circuit, based on the determining the B-MIMO Mode A capability of the first electronic device and the determining the desirability and/or ability of the network node to service the uplink communication between the network node and the first electronic device using the B-MIMO Mode A communication protocol, transmits a first B-MIMO communication mode selection command signal to the first electronic device via the antenna arrangement for controlling the B-MIMO mode of communication between the network node and the first electronic device. The first B-MIMO communication mode selection command signal specifies that the first electronic device is to use the B-MIMO Mode A communication protocol. The network node thereafter communicates via the antenna arrangement with the first electronic device using the B-MIMO Mode A communication protocol.

The control circuit of the network node is further operable to determine the B-MIMO Mode A capability of the first electronic device by various techniques. In one technique, the B-MIMO Mode A capability of the first electronic device is determined by receiving a signal from the electronic device indicating its capabilities. In this example, the network node receives a first communication capabilities signal form the first electronic device. The first communication capabilities signal may be communicated between the first electronic device and the network node on a selected dedicated communication channel between the first electronic device and the network node for example. The first communication capabilities signal specifies a B-MIMO communication mode capability of the first electronic device as either the B-MIMO Mode A capability for communicating by the first electronic device with the network node using the B-MIMO Mode A communication protocol or as the B-MIMO Mode B capability for communicating by the first electronic device with the network node using a B-MIMO Mode B communication protocol. The B-MIMO Mode A capability of the first electronic device is determined based on the B-MIMO communication mode capability specified by the first communication capabilities signal.

In a further example embodiment, the B-MIMO Mode A capability of the first electronic device is determined in accordance with a manufacturer brand of the first electronic device. In a still further example embodiment, the B-MIMO Mode A capability of the first electronic device is determined in accordance with a model number assigned to the first electronic device by the manufacturer. In a still yet further example embodiment, the B-MIMO Mode A capability of the first electronic device is determined in accordance with a manufacturer-assigned release specification of the first electronic device. In still yet a further example embodiment, the B-MIMO Mode A capability of the first electronic device is determined in accordance with a default support capability of the first electronic device.

The control circuit of the network node is further operable to determine an undesirability and/or an inability of the network node to service the uplink communication between the network node and the first electronic device using the B-MIMO Mode A communication protocol. Based on determining the undesirability and/or the inability of the network node to service the uplink communication between the network node and the first electronic device using the B-MIMO Mode A communication protocol, the control circuit transmits via the antenna arrangement a second B-MIMO communication mode selection command signal to the first electronic device for controlling the B-MIMO mode of communication between the network node and the first electronic device. The second B-MIMO communication mode selection command signal specifies that the first electronic device is to use the B-MIMO Mode B communication protocol. The B-MIMO communication mode selection command signal is communicated via the antenna arrangement to the first electronic device using the B-MIMO Mode B communication protocol.

The control circuit of the network node is further operable to selectively determine the desirability and/or ability of the network node to communicate with the first electronic device using the B-MIMO Mode A communication protocol in accordance with beam distribution metrics and/or performance or processing load totals. The desirability of B-MIMO Mode A communication with the electronic device may be determined by determining a distribution of the at least one electronic device of a plurality of electronic devices other than the first electronic device over communication beams of the network node, determining a beam distribution servicing overhead of communicating with the network node using the B-MIMO Mode A communication protocol together with the communicate a quantity of electronic devices other than the first electronic device using the MIMO communication protocol, and determining the beam distribution servicing overhead being less than a predetermined overhead threshold. In addition, desirability and/or inability of B-MIMO Mode A communication with the electronic device may be determined by determining a communication processing capacity of the network node not exceeding a communication processing burden of the network node communicating using the B-MIMO Mode A communication protocol with the first electronic device and with the at least one electronic device other than the first electronic device using the one or more generic MIMO communication protocol(s).

The control circuit of the network node of the example embodiment is further operable to selectively determine the desirability and/or ability of the network node to communicate with the first electronic device using the B-MIMO Mode A communication protocol by determining a condition of one or more communication channels used for the communicating by the network node with the at least one electronic device of a plurality of electronic devices other than the first electronic device using the MIMO communication protocol, and selectively determining the desirability and/or ability of the network node to communicate with the first electronic device using the B-MIMO Mode A communication protocol based on the condition of the one or more communication channels.

System, Alternative Embodiment

In accordance with a further example embodiment, a network node is operable to control a B-MIMO Mode of uplink communication over a communication channel between a network node and a first electronic device. For convenience of discussion and ease of description, the example embodiments will be described in connection with control of B-MIMO Modes of uplink communication. It is to be appreciated however that the embodiments are not limited to control of only Beam MIMO, or of only Polarization MIMO, but rather apply equivalently to any other forms of multiple input multiple output uplink communication protocols now know or hereinafter developed.

In the embodiment, the network node preferably comprises an antenna arrangement and a control circuit comprising a processor and a memory. The control circuit is coupled with the antenna arrangement and is operable to communicate with at least one electronic device of a plurality of electronic devices other than the first electronic device using an uplink MIMO communication protocol. The control circuit is further operable to receive from the first electronic device a first communication capabilities signal.

The first communication capabilities signal specifies a B-MIMO communication mode capability of the first electronic device as being either a B-MIMO Mode A capability for communicating by the first electronic device with the network node using the B-MIMO Mode A communication protocol or as a B-MIMO Mode B capability for communicating by the first electronic device with the network node using a B-MIMO Mode B communication protocol. The control circuit is further operable to determine the B-MIMO Mode A capability of the first electronic device based on the B-MIMO communication mode capability specified by the first communication capabilities signal. The control circuit is further operable to, responsive to determining the B-MIMO Mode A capability of the first electronic device, selectively determine a desirability and/or an ability of the network node to service the uplink communication between the network node and the first electronic device using the B-MIMO Mode A communication protocol together with servicing the uplink communicating with the at least one electronic device of the plurality of electronic devices other than the first electronic device using the one or more generic MIMO communication protocol(s). The control circuit is further operable to, based on the determining by the network node the B-MIMO Mode A capability of the first electronic device and the determining by the network node the desirability and/or ability of the network node to service the uplink communication between the network node and the first electronic device using the B-MIMO Mode A communication protocol, transmit a first B-MIMO communication mode selection command signal to the first electronic device for controlling the B-MIMO mode of communication between the network node and the first electronic device. The first B-MIMO communication mode selection command signal specifies that the first electronic device is to use the B-MIMO Mode A communication protocol.

In the example embodiment, the control circuit may thereafter communicate with the first electronic device using the B-MIMO Mode A communication protocol, and communicate with the at least one electronic device of a plurality of electronic devices other than the first electronic device using the MIMO communication protocol(s).

Further in accordance with the third example embodiment, the control circuit is further operable to, responsive to determining the B-MIMO Mode A capability of the first electronic device, determine an undesirability and/or an inability of the network node to service the uplink communication between the network node and the first electronic device using the B-MIMO Mode A communication protocol together with servicing the uplink communicating with the at least one electronic device of a plurality of electronic devices other than the first electronic device using the one or more generic MIMO communication protocol(s). The control circuit is further operable to, based on the determining by the network node the B-MIMO Mode A capability of the first electronic device and the determining the undesirability and/or an inability of the network node to service the uplink communication between the network node and the first electronic device using the B-MIMO Mode A communication protocol, transmit a second B-MIMO communication mode selection command signal to the first electronic device for controlling the B-MIMO mode of communication between the network node and the first electronic device. The second B-MIMO communication mode selection command signal specifies that the first electronic device is to use the B-MIMO Mode B communication protocol.

In the example embodiment, the control circuit may thereafter communicate with the first electronic device using the B-MIMO Mode B communication protocol, and communicate with the at least one electronic device of a plurality of electronic devices other than the first electronic device using the one or more generic MIMO communication protocol(s).

System, Further Alternative Embodiment

In accordance with a yet a further example embodiment, a network node is operable to control a B-MIMO Mode of uplink communication over a communication channel between a network node and a first electronic device. For convenience of discussion and ease of description, the example embodiments will be described in connection with control of B-MIMO Modes of uplink communication. It is to be appreciated however that the embodiments are not limited to control of only Beam MIMO, or of only Polarization MIMO, but rather apply equivalently to any other forms of multiple input multiple output uplink communication protocols now know or hereinafter developed.

In the embodiment, the network node includes an antenna arrangement and a control circuit. The control circuit includes a processor and a memory. The control circuit is operably coupled with the antenna arrangement and is operable to communicate with at least one electronic device of a plurality of electronic devices other than the first electronic device using one or more generic MIMO communication protocol(s). The control circuit is further operable to receive a first communication request signal from the first electronic device. The first communication request signal specifies a communication mode selection request indicating a request for communicating by the first electronic device with the network node, and a preference by the first electronic device to use the B-MIMO Mode A communication protocol over or relative to a B-MIMO Mode B communication protocol. The control circuit is further operable to, responsive to receiving the communication mode selection request, selectively determine a desirability and/or an ability of the network node to communicate with the first electronic device using the B-MIMO Mode A communication protocol. The control circuit is further operable to transmit a first communication grant signal from the network node to the first electronic device in accordance with the ability of the network node to communicate with the first electronic device using the B-MIMO Mode A communication protocol. The first grant signal specifies a first communication mode selection grant indicating a grant by the network node to the first electronic device for the first electronic device to communicate with the network node using the B-MIMO Mode A communication protocol.

In the example embodiment, the control circuit may thereafter communicate with the first electronic device using the B-MIMO Mode A communication protocol, and communicate with the at least one electronic device of a plurality of electronic devices other than the first electronic device using the one or more generic MIMO communication protocol(s).

In the example embodiment, the control circuit is further operable to selectively determine, responsive to receiving the communication mode selection request, an undesirability and/or an inability of the network node to communicate with the first electronic device using the B-MIMO Mode A communication protocol. The control circuit may transmit a second communication grant signal from the network node to the first electronic device in accordance with the undesirability and/or inability of the network node to communicate with the first electronic device using the B-MIMO Mode A communication protocol. The second communication grant signal specifies a second communication mode selection grant indicating a grant by the network node to the first electronic device for the first electronic device to communicate with the network node using the B-MIMO Mode B communication protocol.

In the example embodiment the control circuit may thereafter communicate with the first electronic device using the B-MIMO Mode B communication protocol, and communicate with the at least one electronic device of a plurality of electronic devices other than the first electronic device using the MIMO communication protocol(s).

DETAILED DESCRIPTION OF EMBODIMENTS

Figure 1:
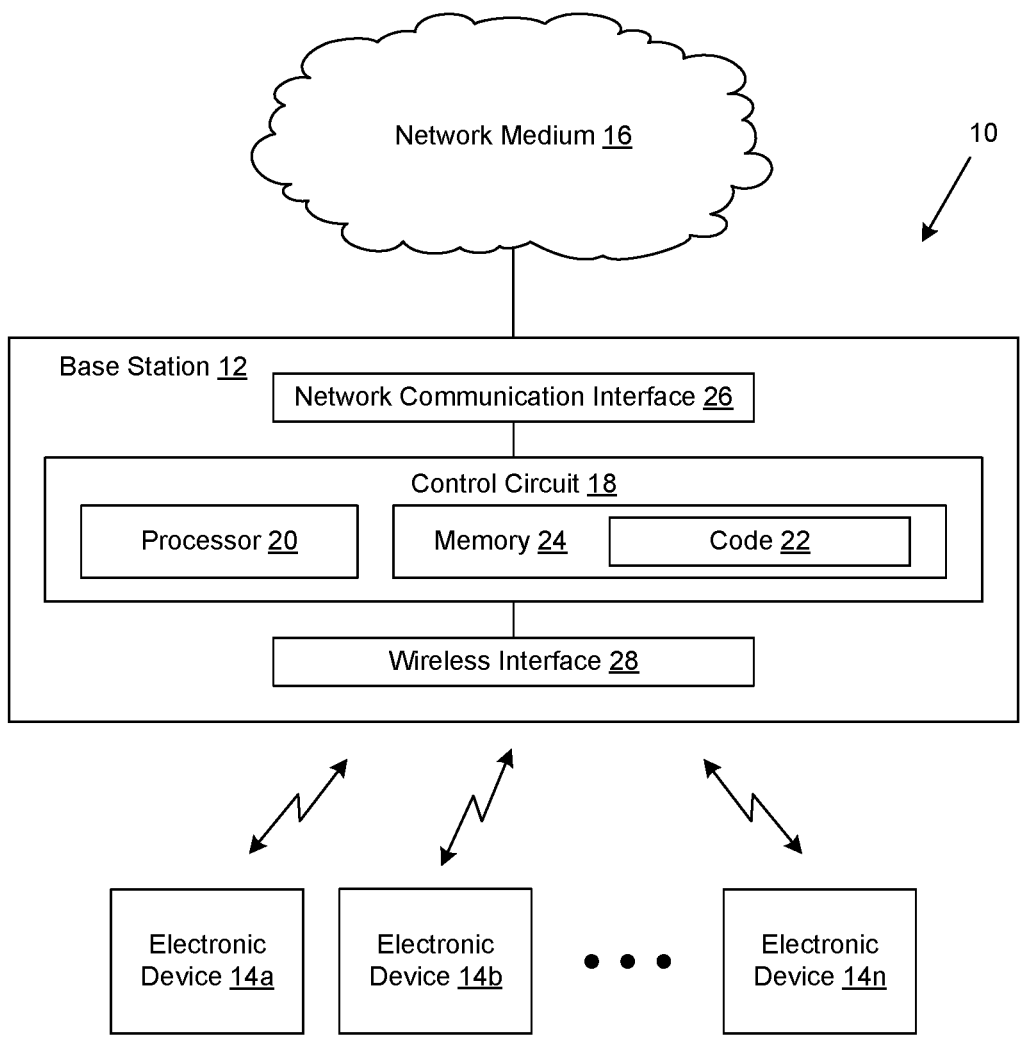
FIG. 1 is a schematic block diagram of a network system that utilizes MIMO mode selection for multi-beam wireless radio communications.

Embodiments will now be described with reference to the drawings, wherein like reference numerals are used to refer to like elements throughout. It will be understood that the figures are not necessarily to scale. Features that are described and/or illustrated with respect to one embodiment may be used in the same way or in a similar way in one or more other embodiments and/or in combination with or instead of the features of the other embodiments.

Described below, in conjunction with the appended figures, are various embodiments of systems and methods for selecting a communication mode in a wireless network. A communication mode selection procedure may be carried out by the respective devices in an automated manner to identify a desired mode for communication between an electronic device and a base station based on an ability and/or desirability of the base station to communicate with the electronic device using a communication mode desired by the electronic device.

In general and overall in accordance with the example embodiments herein, the communication mode decision for communication with the electronic device is made by the base station based on: a capability of the electronic user equipment device; the manner in which the electronic user equipment devices are distributed over the one or more communication beams of the base station; and the performance and/or processing total load implications for the base station to take on the communication with the electronic user equipment devices in the selected mode. In an embodiment, MIMO Mode A uplink communication between a MIMO Mode A capable electronic device and a base station will only occur if the base station has the processing capabilities to effect the MIMO Mode A communication in consideration of the base station already communicating with other electronic devices in P-MIMO Mode A, P-MIMO Mode B, B-MIMO Mode A, B-MIMO Mode B, and/or other modes. Otherwise, MIMO Mode B will be used between the base station and the electronic device regardless of the MIMO Mode A communication capability of the electronic device. The method may control a P-MIMO Mode of uplink communication between the network node and the first electronic device, it may control a B-MIMO Mode of uplink communication between the network node and the first electronic device, and/or it may control both P-MIMO and B-MIMO Modes uplink communication between the network node and the first electronic device. For convenience of discussion and description, however, the example embodiments will be described in connection with control of B-MIMO Modes of uplink communication. It is to be appreciated however that the embodiments are not limited to control of only Beam MIMO, or of only Polarization MIMO, but rather apply equivalently to any other forms of multiple input multiple output uplink communication protocols now know or hereinafter developed.

In one form, the electronic device may broadcast its communication capability to the base station whereupon the base station selects a communication mode for the communication between the electronic device and the base station based on the communication capability of the electronic device, and also based upon the communication processing ability of the base station.

In another form, the electronic device may broadcast a communication mode request to the base station whereupon the base station selects a communication mode for the communication between the electronic device and the base station based on the communication mode request received from the electronic device, and also based upon the communication processing ability of the base station.

In addition and/or alternatively, the network node may determine the B-MIMO Mode A capability of the first electronic device by determining a manufacturer brand of the first electronic device. In further addition and/or alternatively, the network node may determine the B-MIMO Mode A capability of the first electronic device by determining a manufacturer-assigned model number of the first electronic device. In still further addition and/or alternatively, the network node may determine the B-MIMO Mode A capability of the first electronic device by determining a manufacturer-assigned release specification of the first electronic device. In still yet further addition and/or alternatively, the network node may determine the B-MIMO Mode A capability of the first electronic device by determining a default support capability of the first electronic device.

The Mode A/B may be determined at a time when the electronic device joins a communication network including the base station and a plurality of electronic devices other than the newly joining electronic device. Preferably, the Mode A/B determination is made by the base station based on an ability and/or a desirability of the base station to effectively process the B-MIMO Mode A communication with the newly joining electronic device and on the communication capability of the newly joining electronic device.

The Mode A/B may be determined by the base station based on the channel conditions. For example, in a scenario where all electronic user equipment devices are distributed on different base station BS beams, (non-overlapping), all of the electronic user equipment devices can be operated in the B-MIMO Mode A, while electronic user equipment devices that share one or more base station beams need to be decoded commonly independent on the mode, which leads to the higher complexity for the base station. In that case, granting B-MIMO Mode A to electronic user equipment devices that share one or more base station beams would in such case increase the complexity even more. In that case the base station would resolve the Mode A/B determination as an undesirability and/or an inability of the base station to adequately support the Mode A and instead control the electronic user equipment devices to operate in the B-MIMO Mode B.

In addition, as the base station knows what beams the electronic user equipment devices have been scheduled to, it may handle electronic user equipment devices sharing base station beams in sub-groups. This reduces the total complexity.

In further addition, for a dynamic situation electronic user equipment devices are dynamically are set to Mode A or Mode B pending on changing channel conditions caused by mobility of the electronic user equipment devices and what beams they need to use (hence they may become overlapping).

Communication by the electronic device with the base station using B-MIMO Mode A will not be used if the base station does not have the processing capabilities, and instead communication using Beam MIMO Mode B will be used for the selected electronic user equipment devices.

The system and procedure described herein allows for maximizing the number of electronic devices that enjoy the high data rates associated with beam based MIMO in Mode A, while preventing communication interruptions due to unfavorable burdens foisted onto the base station in excess of the communication processing capacity of the base station.

System Architecture

In general, MIMO is implemented in LTE and involves the use of multiple transmission layers from multiple antennas at both sides of a link. The number of layers are less or equal to the number of antennas at the side which has the least antennas. For NR or in general at higher frequencies when beamforming is used, the receiving device (e.g. electronic device) identifies beam pairs (e.g. beams as seen from the terminal that reach the base station). For MIMO in mm-wave with beamforming, the electronic device identifies the strongest beams (with different beam ID) and selects the beams which are the strongest. For 2×2 MIMO, this corresponds to selecting the two strongest beam pairs. This process is defined as beam MIMO (B-MIMO) in this context. If the electronic device is restricted to operate dual transmit streams in a single direction but at orthogonal polarization we define this as polarization MIMO (P-MIMO). P-MIMO is then a subset of B-MIMO and the P-MIMO condition applies when the electronic device identifies that the two beam pairs with different IDs are arriving from the same angle but with separable polarization such as, for example, orthogonal polarization.

In addition to the above, it is to be appreciated from the disclosure herein that Beam MIMO can be operated in two fundamentally different modes: Beam MIMO Mode A, and Beam MIMO Mode B. Beam MIMO Mode B is slightly inferior to Beam MIMO Mode A as will be explained herein below. Accordingly, the first mode, Beam MIMO Mode A, is the mode preferred by B-MIMO Mode A capable User Equipment (UE) devices since it leads to higher data rates. However, Base Stations (BSs) cannot always engage all UEs in the Beam MIMO Mode A since in the presence of other UEs, it may require prohibiting decoding complexity at the BS. Therefore, the BS can only communicate in B-MIMO Mode A with some selected B-MIMO Mode A capable UEs, while other UEs are required to use the slightly inferior mode B. Embodiments disclosed herein relate to the BS determining a Beam MIMO Mode A/B, and sending a control signal to one or more UEs indicating the communication mode commanded or otherwise granted by the BS. This results in the benefit maximizing the overall communication throughput of the system while at the same time preventing the BS from becoming overburdened with processing beyond its practical capabilities.

FIG. 1 is a schematic diagram of an exemplary network system 10 for implementing the disclosed techniques. It will be appreciated that the illustrated system is representative and other systems may be used to implement the disclosed techniques. The exemplary network system 10 includes a base station 12 that operates in accordance with a cellular protocol, such as a protocol promulgated by 3GPP or another standard. For instance, the network system 10 may operate in accordance with LTE, LTE-A, or a 5G NR standards. However, it is to be appreciated that the techniques described herein can be applied to substantially any wireless communication system that utilizes MIMO or multiple beams between respective devices. This includes Polarization MIMO A, Polarization MIMO B, Beam MIMO A, and Beam MIMO B.

The network system 10 of the illustrated example supports cellular-type protocols, which may include circuit-switched network technologies and/or packet-switched network technologies. The network system 10 includes a base station 12 that services one or more electronic devices 14, designated as electronic devices 14a-14n in FIG. 1. The base station 12 may support communications between the electronic devices 14a-14n and a network medium 16 through which the electronic devices 14a-14n may communicate with other electronic devices 14, servers, devices on the Internet, etc. The base station 12 may be an access point, an evolved NodeB (eNB) in a 4G network or a next generation NodeB (gNB) in a 5G or NR network as well as a second terminal (e.g. device to device communications). The base station 12 may also be multiple cooperating nodes such as, for example, a gNb with more than one TRxP (transmission points) or multiple gNb. As utilized herein, the term "base station" may refer, generally, to any device that services user devices and enables communications between the user devices and the network medium or a second device and, thus, includes the specific examples above depending on the network implementation. It should be appreciated that while the term "base station" is used with regards to embodiments disclosed herein, the electronic device may communicate with any type of network node according to the disclosed embodiments, including, but not limited to, a second electronic device or a different type of network element.

In one embodiment, the network system 10 supports multi-beam operations between the base station 12 and the electronic devices 14 such that the base station 12 can transmit using a plurality of beams (generated with beam-forming techniques, for example) and the electronic devices 14 can receive using one or more reception beams. During multi-beam operations, the base station 12 may retransmit certain messages (with or without differences) using each available transmit beam, which is referred to as beam sweeping. In particular, such beam sweeping may occur when the base station 12 communicates information to electronic devices 14 before establishing a specific, known beam for each electronic device 14. For example, beam sweeping may be used to dynamically determine whether channel conditions are favorable for polarized MIMO (P-MIMO) communications in P-MIMO Mode A or P-MIMO Mode B, or whether Beam MIMO Mode A (B-MIMO Mode A) or Beam MIMO Mode B (B-MIMO Mode B) should be used.

The base station 12 may include operational components for carrying out the wireless communications, the communication mode selection described herein and other functions of the base station 12. For instance, the base station 12 may include a control circuit 18 that is responsible for overall operation of the base station 12, including controlling the base station 12 to carry out the operations described in greater detail below. The control circuit 18 includes a processor 20 that executes code 22, such as an operating system and/or other applications. The functions described in this disclosure document may be embodied as part of the code 22 or as part of other dedicated logical operations of the base station 12. The logical functions and/or hardware of the base station 12 may be implemented in other manners depending on the nature and configuration of the base station 12. Therefore, the illustrated and described approaches are just examples and other approaches may be used including, but not limited to, the control circuit 18 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 22 and any stored data (e.g., data associated with the operation of the base station 12) may be stored on a memory 24. The code may be embodied in the form of executable logic routines (e.g., a software program) that is stored as a computer program product on a non-transitory computer readable medium (e.g., the memory 24) of the base station 12 and is executed by the processor 20. The functions described as being carried out by the base station 12 may be thought of as methods that are carried out by the base station 12.

The memory 24 may be, for example, one or more of a buffer, a flash memory, a hard drive, a removable media, a volatile memory, a non-volatile memory, a random access memory (RAM), or other suitable device. In a typical arrangement, the memory 24 includes a non-volatile memory for long term data storage and a volatile memory that functions as system memory for the control circuit 18. The memory 24 is considered a non-transitory computer readable medium.

The base station 12 includes communications circuitry that enables the base station 12 to establish various communication connections. For instance, the base station 12 may have a network communication interface 26 to communicate with the network medium 16. Also, the base station 12 may have a wireless interface 28 over which wireless communications are conducted with the electronic devices 14, including the multi-beam operations and procedures described herein. The wireless interface 28 may include a radio circuit having one or more radio frequency transceivers (also referred to as a modem), one or more antenna assemblies, and any appropriate tuners, impedance matching circuits, and any other components needed for the various supported frequency bands and radio access technologies.

The electronic devices 14 serviced by the base station 12 may be user devices (also known as user equipment or UEs) or machine-type devices. Exemplary electronic devices 14 include, but are not limited to, mobile radiotelephones ("smartphones"), tablet computing devices, computers, a device that uses machine-type communications, machine-to-machine (M2M) communications or device-to-device (D2D) communication (e.g., a sensor, a machine controller, an appliance, etc.), a camera, a media player, or any other device that conducts wireless communications with the base station 12.

Figure 2:
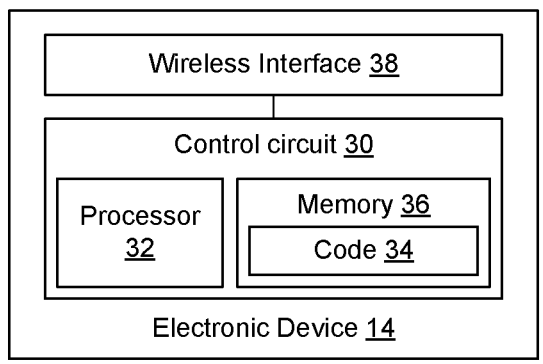
FIG. 2 is a schematic block diagram of communication device that forms part of the network system of FIG. 1.

As shown in FIG. 2, each electronic device 14 may include operational components for carrying out the wireless communications, the communication mode selection described herein and other functions of the electronic device 14. For instance, among other components, each electronic device 14 may include a control circuit 30 that is responsible for overall operation of the electronic device 14, including controlling the electronic device 14 to carry out the operations described in greater detail below. The control circuit 30 includes a processor 32 that executes code 34, such as an operating system and/or other applications. The functions described in this disclosure document may be embodied as part of the code 34 or as part of other dedicated logical operations of the electronic device 14. The logical functions and/or hardware of the electronic device 14 may be implemented in other manners depending on the nature and configuration of the electronic device 14. Therefore, the illustrated and described approaches are just examples and other approaches may be used including, but not limited to, the control circuit 30 being implemented as, or including, hardware (e.g., a microprocessor, microcontroller, central processing unit (CPU), etc.) or a combination of hardware and software (e.g., a system-on-chip (SoC), an application-specific integrated circuit (ASIC), etc.).

The code 34 and any stored data (e.g., data associated with the operation of the electronic device 14) may be stored on a memory 36. The code 34 may be embodied in the form of executable logic routines (e.g., a software program) that is stored as a computer program product on a non-transitory computer readable medium (e.g., the memory 36) of the electronic device 14 and is executed by the processor 32. The functions described as being carried out by the electronic device 14 may be thought of as methods that are carried out by the electronic device 14.

The memory 36 may be, for example, one or more of a buffer, a flash memory, a hard drive, a removable media, a volatile memory, a non-volatile memory, a random access memory (RAM), or other suitable device. In a typical arrangement, the memory 36 includes a non-volatile memory for long term data storage and a volatile memory that functions as system memory for the control circuit 30. The memory 36 is considered a non-transitory computer readable medium.

The electronic device 14 includes communications circuitry that enables the electronic device 14 to establish various communication connections. For instance, the electronic device 14 may have a wireless interface 38 over which wireless communications are conducted with the base station 12, including the multi-beam operations and procedures described herein. The wireless interface 38 may include a radio circuit having one or more radio frequency transceivers (also referred to as a modem), at least one antenna assembly, and any appropriate tuners, impedance matching circuits, and any other components needed for the various supported frequency bands and radio access technologies.

Other components of the electronic device 14 may include, but are not limited to, user inputs (e.g., buttons, keypads, touch surfaces, etc.), a display, a microphone, a speaker, a camera, a sensor, a jack or electrical connector, a rechargeable battery and power supply unit, a SIM card, a motion sensor (e.g., accelerometer or gyro), a GPS receiver, and any other appropriate components.

MIMO Operations of UEs and MIMO Mode Effect on BS

Figure 3:
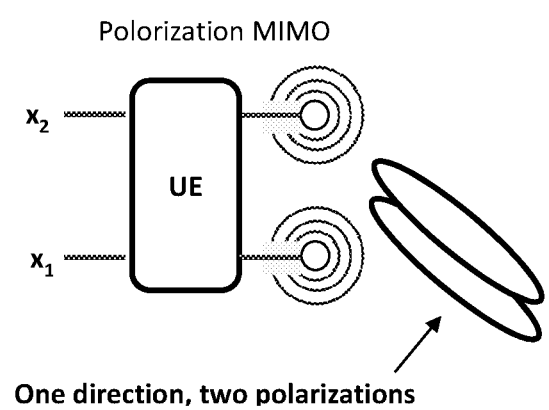
FIG. 3 illustrates a Polarization MIMO operation of a User Equipment.

FIG. 3 illustrates a first way to synthesize MIMO operation of a UE. In particular, basic Polarization MIMO (P-MIMO) is shown in a simplified diagram wherein, the UE transmits two data symbols onto two beams that have the same direction, but different polarization. In the Polarization MIMO illustrated, the UE may arbitrarily assign the data symbols to the beams. It is to be appreciated, however, that the showing can be scaled up to multiple directions, each with two polarizations. For example if there are more than one TRxP, then there may be more line of sights, or simply for multiple reflections.

Figure 4A:
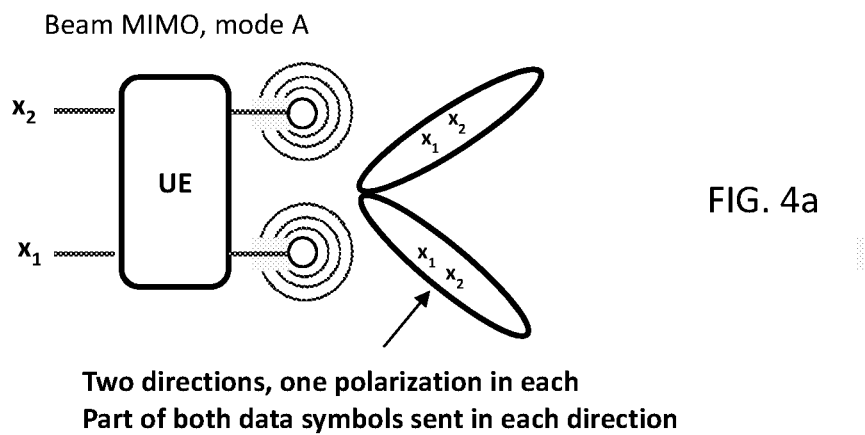
FIG. 4a illustrates a Beam MIMO Mode A operation of a User Equipment.
Figure 4B:
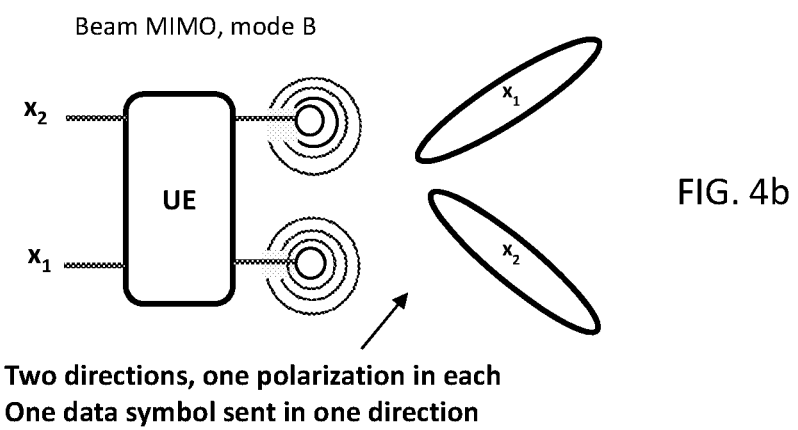
FIG. 4b illustrates a Beam MIMO Mode B operation of a User Equipment.

FIGS. 4a and 4b illustrate another way to synthesize MIMO operation of a UE. In particular, Beam MIMO is shown wherein, two beams point in different directions, and wherein there is one polarization per beam. Given that in Beam MIMO (B-MIMO) there are two beams available and one polarization per beam, there are two choices for data symbol assignment. Intuitively, B-MIMO Mode A is preferred because it sends both data streams $x_1$ and $x_2$ in both directions as shown in the Figure simplistically for illustration purposes only as a beam extending slightly upwardly and a beam extending slightly downwardly. Also intuitively, B-MIMO Mode B is slightly suboptimal because it sends one data stream $x_1$ on one beam as shown in the Figure simplistically for illustration purposes only as extending slightly upwardly, and it sends the other data stream $x_2$ on the other beam as shown in the Figure simplistically for illustration purposes only as extending slightly downwardly.

Not intuitively and somewhat surprisingly, data symbol assignment choices in B-MIMO leads to vastly different impacts on BS decoding complexity. Beam MIMO in mode A will lead to exponential complexity if always applied by the base station 12 across all of the user equipment devices 14a-14n. On the other hand, B-MIMO Mode A leads to superior performance and should be applied whenever manageable. In accordance with the embodiments herein, therefore, the base station 12 determines a MIMO Modes for each of the UEs 14a-14n for optimal overall system performance. The base station 12 sends command control signals to each of the UEs 14a-14n for their respective MIMO Mode assignment. Preferably, the BS 12 sends the command MIMO Mode assignment control signals to each of the UEs 14a-14n as they join the network. Further preferably, the BS 12 sends the command MIMO Mode assignment control signals to each of the UEs 14a-14n as they request to join the network so that each UE 14a-14n may join the network using their respective proper MIMO Mode assignment thereby minimizing the chance of the BS 12 from becoming overwhelmed with the additional incremental processing needed to service a UE that is newly joining a network of UEs in established communication with the BS 12.

In the embodiments, the BS may send control signals to the UEs indicating or otherwise commanding the UEs to communicate using one of the following three alternatives:

1) Use Polarization MIMO (what beam to use is assumed already known);
2) Use Beam MIMO, mode A (what beams to use is assumed already known); or
3) Use Beam MIMO, mode B (Mode A denied, and what beams to use is assumed already known).

Preferably, the UR declares what modes it supports and the BS then in turn instructs or otherwise commands the UE what mode to use. Using this control protocol, the UE is not a part of the communication Mode A/B decision, and it does not request anything. It may be assumed that it is in the interest of the network to schedule all UEs to as large capacity as possible.

To help to facilitate explanation of the embodiments, reasons for the exponential complexity associated to unrestricted usage of B-MIMO Mode A will be discussed. In general, the BS 12 has a number of beams that it is using for receiving the signals from the multiple UEs. The BS collects the signals across all its beams and performs a MIMO detection to retrieve the symbols. The MIMO detection is, in general, of exponential complexity in the number of involved symbols. However, one BS beam can be used to receive signals from multiple UEs, and this may lead to a trellis structure among the symbols, resulting in enormous complexity for the BS 12 to adequately service all the UEs 14a-14n.

Figure 5:
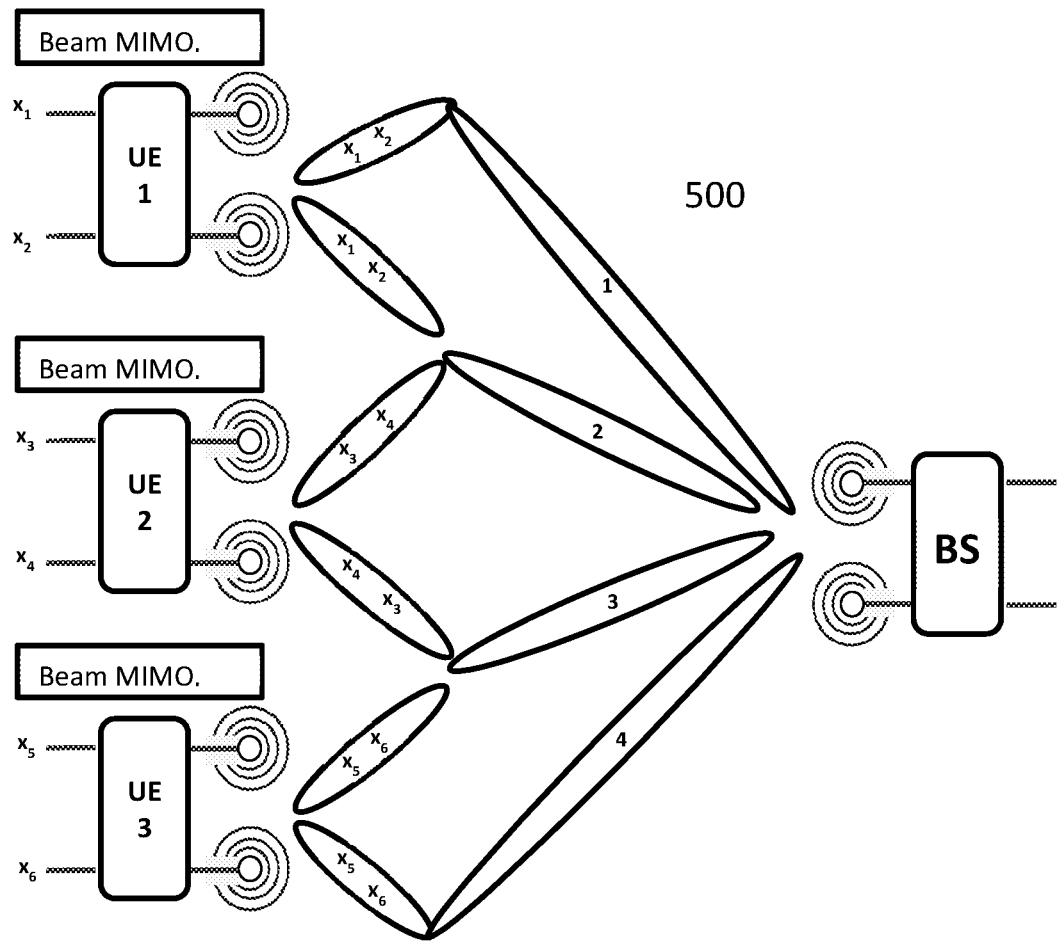
FIG. 5 is a schematic block diagram of a communication system wherein a base station controls the selection of communication with user equipment devices to be B-MIMO Mode A in accordance with an embodiment.

FIG. 5 shows an example embodiment illustrating a set of three (3) UEs UE1, UE2, and UE3 in a communication network 500. In this example, each of the UEs UE1, UE2, and UE3 applies Beam MIMO mode A. The BS in this example embodiment has four (4) beams. In the Figure, all beams are shown in a somewhat exaggerated form with respect to their spatial focus. As can be appreciated and in accordance with MIMO detection, the BS must decode all six (6) data streams jointly, rendering a complexity that is $O(M^6)$, where M is the cardinality of the QAM constellation.

It is to be appreciated that there may be other reasons for setting the uplink MIMO Mode A/B in accordance with the embodiments herein. To that end and by way of example, one may also think of a situation where a UE1 sees TRxP1-beam 1 and 2 and can use mode A, while UE2 sees TRxP1 beam 1 and TRxP2 beam 5 and, due to the limited bandwidth between the TRxPs, UE 2 needs to use mode B.

The uplink Mode A/B may be determined and set or otherwise controlled by the base station based on the channel conditions. For example, in a scenario where all electronic user equipment devices are distributed on different base station BS beams, (non-overlapping), all of the electronic user equipment devices can be operated in the B-MIMO Mode A, while electronic user equipment devices that share one or more base station beams need to be decoded commonly independent on the mode, which leads to the higher complexity for the base station. In that case, granting B-MIMO Mode A to electronic user equipment devices that share one or more base station beams would in such case increase the complexity even more. In that case the base station would resolve the Mode A/B determination as an undesirability and/or an inability of the base station to adequately support the Mode A and instead control the electronic user equipment devices to operate in the B-MIMO Mode B.

In addition, as the base station knows what beams the electronic user equipment devices have been scheduled to, it may handle electronic user equipment devices sharing base station beams in sub-groups. This reduces the total complexity.

In further addition, for a dynamic situation electronic user equipment devices are dynamically are set to Mode A or Mode B pending on changing channel conditions caused by mobility of the electronic user equipment devices and what beams they need to use (hence they may become overlapping).

Communication by the electronic device with the base station using B-MIMO Mode A will not be used if the base station does not have the processing capabilities, and instead communication using Beam MIMO Mode B will be used for the selected electronic user equipment devices.

The present disclosure includes the above example reason for setting the MIMO mode by the base station as well as any other equivalent reasons for setting the MIMO mode in accordance with the embodiments herein.

With continued reference to FIG. 5, beam 1 of the network node BS of the communication network 500 sees data streams $x_1$ and $x_2$. Similarly, beam 2 of the network node BS also sees data streams $x_1$ and $x_2$. Therefore, beam 1 and beam 2 of the network node BS cannot be decoupled.

Beam 2 of the network node BS of the communication network 500 further sees data streams $x_3$ and $x_3$. Similarly, beam 3 of the network node BS also sees data streams $x_3$ and $x_4$. Therefore, beam 2 and beam 3 of the network node BS cannot be decoupled.

Beam 3 of the network node BS of the communication network 500 further sees data streams $x_5$ and $x_6$. Similarly, beam 4 of the network node BS also sees data streams $x_5$ and $x_6$. Therefore, beam 3 and beam 4 of the network node BS cannot be decoupled.

Overall, then, the beams 1, 2, 3, and 4 of the network node BS of the communication network 500 cannot be decoupled.

In the embodiment shown in FIG. 5, however, the BS has determined for each of UE 2 and UE3 that it is able to service B-MIMO Mode A communication. That is, the network node or base station BS may already be communicating with a plurality of electronic devices UE2, UE3 other than a first electronic device UE1 using a Beam MIMO Mode A communication protocol.

UE Mode A Capable, Joins in Mode A

In the embodiment shown in FIG. 5, the network node or base station BS may already be communicating with a plurality of electronic devices UE2, UE3 other than a first electronic device UE1 using a Beam MIMO Mode A communication protocol. For convenience of discussion and ease of description, the example embodiments will be described in connection with control of B-MIMO Modes of communication. It is to be appreciated however that the embodiments are not limited to control of only Beam MIMO, or of only Polarization MIMO, but rather apply equivalently to any other forms of multiple input multiple output communication protocols now know or hereinafter developed.

A determination in accordance with a first example embodiment herein of the B-MIMO Mode A/B communication protocol for communication between UE1 and the BS will be discussed. The Mode A/B decision may be responsive to the UE1 newly joining the communication network. The decision may also be responsive to UE1 moving relative to the BS and the situation changing, wherein the BS therefore may need to rearrange which ones to use what mode. In accordance with an example embodiment herein, BS may determine that the electronic device UE1 is B-MIMO Mode A capable whereupon the base station BS selects a communication B-MIMO Mode A/B for the communication between the electronic device and the base station based on the communication capability of the electronic device, and also based upon the communication processing ability of the base station.

Responsive to determining the B-MIMO Mode A capability of the first electronic device UE1, the BS selectively determines a desirability and/or ability of the BS to service the uplink communication between the network node BS and the first electronic device UE1 using the B-MIMO Mode A communication protocol together with servicing the uplink communicating with the at least one electronic device UE2, UE3 of the plurality of electronic devices other than the first electronic device UE1, the other electronic devices UE2, UE3 using one or more generic MIMO communication protocol(s).

Based on the BS determining the B-MIMO Mode A capability of the first electronic device UE1 and the BS determining the desirability of the network node BS to service the uplink communication between the network node BS and the first electronic device UE1 using the B-MIMO Mode A communication protocol, the BS transmits a first B-MIMO communication mode selection command signal to the first electronic device UE1 for controlling the B-MIMO mode of communication between the network node BS and the first electronic device UE1. The first B-MIMO communication mode selection command signal specifies that the first electronic device UE1 is to use the B-MIMO Mode A communication protocol.

The BS then communicates with the first electronic device UE1 using the B-MIMO Mode A communication protocol.

In accordance with an embodiment, the network node BS may determine the B-MIMO Mode A capability of the first electronic device UE1 by determining a manufacturer brand of the first electronic device UE1. In further addition and/or alternatively, the network node BS may determine the B-MIMO Mode A capability of the first electronic device UE1 by determining a manufacturer-assigned model number of the first electronic device UE1. In still further addition and/or alternatively, the network node BS may determine the B-MIMO Mode A capability of the first electronic device UE1 by determining a manufacturer-assigned release specification of the first electronic device UE1. In still yet further addition and/or alternatively, the network node BS may determine the B-MIMO Mode A capability of the first electronic device UE1 by determining a default support capability of the first electronic device UE1.

The BS may selectively determine the desirability of the network node BS to communicate with the first electronic device UE1 using the B-MIMO Mode A communication protocol by one or more of determining the desirability based on beam distribution and/or determining the desirability based on performance or load processing capability. The BS may determine the desirability based on beam distribution by determining a distribution of the at least one electronic device UE2, UE3 of a plurality of electronic devices other than the first electronic device UE1 over communication beams of the network node BS, determining a beam distribution servicing overhead of communicating with the network node BS using the B-MIMO Mode A communication protocol together with the communication with the quantity of electronic devices UE2, UE3 other than the first electronic device UE1 using the MIMO communication protocol and, determining by the network node BS the beam distribution servicing overhead being less than a predetermined overhead threshold.

The BS may determine the desirability based on performance or load processing capability by determining a communication processing capacity of the network node BS not exceeding a communication processing burden of the network node BS communicating using the B-MIMO Mode A communication protocol with the first electronic device UE1 and with the at least one electronic device UE2, UE3 other than the first electronic device UE1 using the MIMO communication protocol.

The BS may selectively determine the desirability of the network node BS to communicate with the first electronic device UE1 using the B-MIMO Mode A communication protocol by determining a condition of one or more communication channels used for the communicating by the network node BS with the at least one electronic device UE2, UE3 of a plurality of electronic devices other than the first electronic device UE1 using the MIMO communication protocol, and selectively determining the desirability of the network node BS to communicate with the first electronic device UE1 using the B-MIMO Mode A communication protocol based on the condition of the one or more communication channels.

UE Broadcasts Mode A Capability, Joins in Mode A

In the embodiment shown in FIG. 5, the network node or base station BS may already be communicating with a plurality of electronic devices UE2, UE3 other than a first electronic device UE1 using a Beam MIMO Mode A communication protocol. A further determination of the B-MIMO Mode A/B communication protocol for communication between UE1 and the BS will be discussed. The Mode A/B decision may be responsive to the UE1 newly joining the communication network. The decision may also be responsive to UE1 moving relative to the BS and the situation changing, wherein the BS therefore may need to rearrange which ones to use what mode. In accordance with an example embodiment herein, the electronic device UE may broadcast its communication capability to the base station BS whereupon the base station BS selects a communication B-MIMO Mode A/B for the communication between the electronic device and the base station based on the communication capability of the electronic device, and also based upon the communication processing ability of the base station.

The network node BS may already be communicating with at least one electronic device UE2, UE3 of a plurality of electronic devices other than the first electronic device UE1 using one or more generic MIMO communication protocol(s). The BS may receive from the first electronic device UE1 a first communication capabilities signal, the first communication capabilities signal specifying a B-MIMO communication mode capability of the first electronic device UE1 as a B-MIMO Mode A capability for communicating by the first electronic device UE1 with the network node BS using the B-MIMO Mode A communication protocol or as a B-MIMO Mode B capability for communicating by the first electronic device UE1 with the network node BS using a B-MIMO Mode B communication protocol. The network node BS determines the B-MIMO Mode A capability of the first electronic device UE1 based on the B-MIMO communication mode capability specified by the first communication capabilities signal. Responsive to determining the B-MIMO Mode A capability of the first electronic device UE1, the network node BS selectively determines an ability of the network node BS to service the uplink communication between the network node BS and the first electronic device UE1 using the B-MIMO Mode A communication protocol together with servicing the uplink communicating with the at least one electronic device UE2, UE3 of the plurality of electronic devices other than the first electronic device UE1 using the B-MIMO Mode A communication protocol. Based on the determining by the network node BS the B-MIMO Mode A capability of the first electronic device UE1 and the determining by the network node BS the ability of the network node BS to service the uplink communication between the network node BS and the first electronic device UE1 using the B-MIMO Mode A communication protocol, the network node BS transmits a first B-MIMO communication mode selection command signal to the first electronic device UE1 for controlling the B-MIMO mode of communication between the network node BS and the first electronic device UE1, the first B-MIMO communication mode selection command signal specifying that the first electronic device UE1 use the B-MIMO Mode A communication protocol.

Thereafter, the BS may communicate using the Beam MIMO Mode A communication protocol with the first electronic device UE1 together with the plurality of electronic devices UE2, UE3 other than the first electronic device UE1.

In accordance with an example embodiment wherein all UEs are assumed to be of the same rank (two streams in the example), the BS may determine the ability of the network node BS to communicate with the first electronic device UE1 using the Beam MIMO Mode A communication protocol by determining by the network node BS a quantity of electronic devices (two (2) in the embodiment of FIG. 5: UE2 and UE3) other than the first electronic device UE1 communicating with the network node BS using one or more generic MIMO communication protocol(s); determining by the network node BS a threshold number of electronic devices permitted to communicate with the network node BS using the Beam MIMO Mode A communication protocol (which threshold number may be four (4) for example); and determining by the network node BS the ability of the network node BS to communicate with the first electronic device UE1 using the Beam MIMO Mode A communication protocol in accordance with a sum (three (3) in this example) of the first electronic device (one (1) in this example) together with the quantity (two (2) in this example) of electronic devices UE2, UE3 other than the first electronic device UE1 communicating with the network node BS using the one or more generic MIMO communication protocol(s) being less than or equal to the threshold number (four (4) in this example) of electronic devices permitted to communicate with the network node BS using the Beam MIMO Mode A communication protocol. It is to be appreciated in the description above that the use of the total number of streams can be used equivalently to the threshold number of electronic devices of the example permitted to communicate with the network node BS using the Beam MIMO Mode A. In the example, the total number of streams is equivalent to the number of UEs wherein as illustrated each UE communicates using two (2) streams assuming that they all use the same rank.

In accordance with a further example embodiment, the BS may determine the ability of the network node BS to communicate with the first electronic device UE1 using the Beam MIMO Mode A communication protocol by determining a communication processing capacity of the network node BS not exceeding a communication processing burden of the network node BS communicating using the Beam MIMO Mode A communication protocol with the first electronic device UE1 and together with the electronic devices UE2, UE3 other than the first electronic device UE1.

UE Broadcasts Mode A Request, Joins in Mode A

In accordance with a further example embodiment herein, the electronic device UE may broadcast a communication mode request to the base station BS whereupon the base station selects a communication B-MIMO Mode A/B for the communication between the electronic device and the base station based on the communication mode request received from the electronic device, and also based upon the communication processing ability of the base station.

The BS may receive a first communication request signal from the first electronic device UE1, the first communication request signal specifying a communication mode selection request indicating a request for communicating by the first electronic device UE1 with the network node BS and a preference by the first electronic device UE1 to use the Beam MIMO Mode A communication protocol over or relative to a Beam MIMO Mode B communication protocol. The BS may determine its ability to communicate with the first electronic device UE1 using the Beam MIMO Mode A communication protocol, and selectively transmit a first communication grant signal from the network node BS to the first electronic device UE1 in accordance with the ability of the network node BS to communicate with the first electronic device UE1 using the Beam MIMO Mode A communication protocol, the first grant signal specifying a communication mode selection grant indicating a grant by the network node BS to the first electronic device UE1 for the first electronic device UE1 to communicate with the network node BS using the Beam MIMO Mode A communication protocol.

Thereafter, the BS may communicate using the Beam MIMO Mode A communication protocol with the first electronic device UE1 together with the plurality of electronic devices UE2, UE3 other than the first electronic device UE1.

In accordance with an example embodiment wherein all UEs are assumed to be of the same rank (two streams in the example), the BS may determine the ability of the network node BS to communicate with the first electronic device UE1 using one or more generic MIMO communication protocol(s) by determining by the network node BS a quantity of electronic devices (two (2) in the embodiment of FIG. 5: UE2 and UE3) other than the first electronic device UE1 communicating with the network node BS using the Beam MIMO Mode A communication protocol; determining by the network node BS a threshold number of electronic devices permitted to communicate with the network node BS using the Beam MIMO Mode A communication protocol (which threshold number may be four (4) for example); and determining by the network node BS the ability of the network node BS to communicate with the first electronic device UE1 using the Beam MIMO Mode A communication protocol in accordance with a sum (three (3) in this example of the first electronic device (one (1) in this example) together with the quantity (two (2) in this example) of electronic devices UE2, UE3 other than the first electronic device UE1 communicating with the network node BS using the Beam MIMO Mode A communication protocol being less than or equal to the threshold number (four (4) in this example) of electronic devices permitted to communicate with the network node BS using the Beam MIMO Mode A communication protocol. It is to be appreciated in the description above that the use of the total number of streams can be used equivalently to the threshold number of electronic devices of the example permitted to communicate with the network node BS using the Beam MIMO Mode A. In the example, the total number of streams is equivalent to the number of UEs wherein as illustrated each UE communicates using two (2) streams assuming that they all use the same rank.

In accordance with a further example embodiment, the BS may determine the ability of the network node BS to communicate with the first electronic device UE1 using the Beam MIMO Mode A communication protocol by determining a communication processing capacity of the network node BS not exceeding a communication processing burden of the network node BS communicating using the Beam MIMO Mode A communication protocol with the first electronic device UE1 and together with the electronic devices UE2, UE3 other than the first electronic device UE1.

Figure 6:
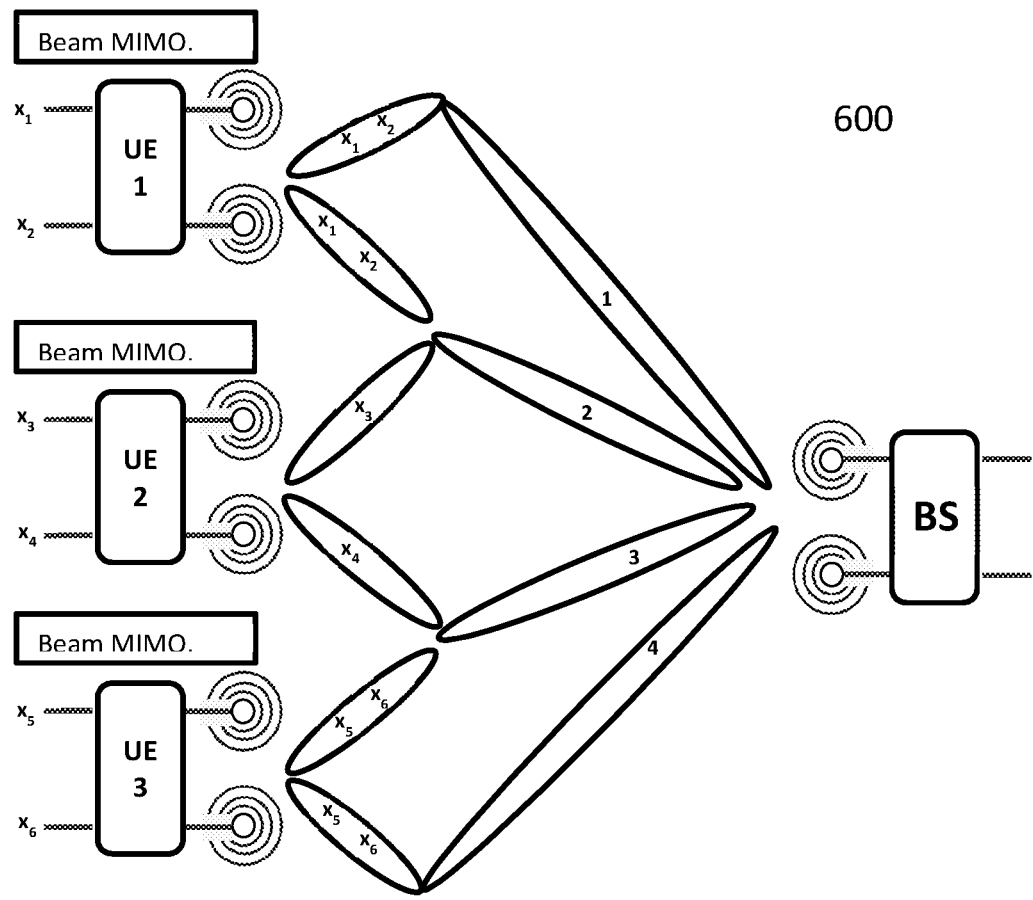
FIG. 6 is a schematic block diagram of a communication system wherein a base station controls the selection of communication with a first set of user equipment devices to be B-MIMO Mode A, and to be B-MIMO Mode B with a second set of user equipment devices in accordance with an embodiment.

Unfortunately, $O(M^6)$ can become a huge number and therefore an overwhelming communication processing burden even for moderate values of M. It may be the case, therefore, that the BS determines that it is unable to efficiently service communication with a UE relative to and/or in addition to the network of UEs already in established communication with the BS 12. FIG. 6 shows an example embodiment illustrating a set of three (3) UEs UE1, UE2, and UE3. In this example, UE1 and UE2 apply Beam MIMO mode A, but UE2 applies Beam Mode B. Similar to the example embodiment of FIG. 5, the BS in the example embodiment of FIG. 6 also has four (4) beams. In the Figure, all beams are shown in a somewhat exaggerated form with respect to their spatial focus.

Beam 1 of the network node BS of the communication network 600 sees data streams $x_1$ and $x_2$. Similarly, beam 2 of the network node BS also sees data streams $x_1$ and $x_2$. Therefore, beam 1 and beam 2 of the network node BS cannot be decoupled.

Beam 2 of the network node BS of the communication network 500 further sees data stream $x_3$.

Beam 3 of the network node BS sees data stream $x_4$ but it does not see, however, data stream $x_4$. Therefore, beam 2 and beam 3 of the network node BS can be decoupled.

Beam 3 of the network node BS of the communication network 600 further sees data streams $x_5$ and $x_6$. Similarly, beam 4 of the network node BS also sees data streams $x_5$ and $x_6$. Therefore, beam 3 and beam 4 of the network node BS cannot be decoupled.

Overall, then, the beams 1 and 2 of the network node BS of the communication network 600 cannot be decoupled, and the beams 3 and 4 of the network node BS of the communication network 600 also cannot be decoupled. Advantageously, however, and in accordance with an embodiment herein, the beam pair comprising beams 1 and 2 of the network node BS of the communication network 600 can be decoupled from the beam pair comprising beams 3 and 4. In accordance with to example embodiment, the ability to limit, restrict or otherwise control the number of UEs that are able to utilize Beam MIMO Mode A communication with a BS has a profound effect on the overall efficiency of the communication network system, particularly when there are more UEs requesting B-MIMO Mode A communication than the network node BS can efficiently process. As can be appreciated the data symbols x1, x2, x3, can be detected separately from the data symbols x4, x5, x6 in the communication network 600 of FIG. 6. Thus, the overall complexity to the network node BS of the communication network 600 is $O(M^3)$. It is to be appreciated, however, that the BS may change the mode for a UE1 in order to enable other UEs.

UE Mode A Capable, Joins in Mode B

In the embodiment shown in FIG. 6, the network node or base station BS may already be communicating with a plurality of electronic devices UE1, UE3 other than a first electronic device UE2 using a Beam MIMO Mode A communication protocol. A determination in accordance with a further embodiment herein of the B-MIMO Mode A/B communication protocol for communication between UE1 and the BS will be discussed. The Mode A/B decision may be responsive to the UE1 newly joining the communication network. The decision may also be responsive to UE1 moving relative to the BS and the situation changing, wherein the BS therefore may need to rearrange which ones to use what mode. In accordance with an example embodiment herein, BS may determine that the electronic device UE1 is B-MIMO Mode A capable whereupon the base station BS selects a communication B-MIMO Mode A/B for the communication between the electronic device and the base station based on the communication capability of the electronic device, and also based upon the communication processing ability of the base station.

Responsive to determining the B-MIMO Mode A capability of the first electronic device UE1, the BS selectively determines a desirability and/or ability of the BS to service the uplink communication between the network node BS and the first electronic device UE1 using the B-MIMO Mode A communication protocol together with servicing the uplink communicating with the at least one electronic device UE2, UE3 of the plurality of electronic devices other than the first electronic device UE1, the other electronic devices UE2, UE3 using one or more generic MIMO communication protocol(s).

In accordance with an embodiment, the network node BS may determine the B-MIMO Mode A capability of the first electronic device UE1 by determining a manufacturer brand of the first electronic device UE1. In further addition and/or alternatively, the network node BS may determine the B-MIMO Mode A capability of the first electronic device UE1 by determining a manufacturer-assigned model number of the first electronic device UE1. In still further addition and/or alternatively, the network node BS may determine the B-MIMO Mode A capability of the first electronic device UE1 by determining a manufacturer-assigned release specification of the first electronic device UE1. In still yet further addition and/or alternatively, the network node BS may determine the B-MIMO Mode A capability of the first electronic device UE1 by determining a default support capability of the first electronic device UE1.

Responsive to determining the B-MIMO Mode A capability of the first electronic device UE1, the BS determines an undesirability and/or inability of the network node BS to service the uplink communication between the network node BS and the first electronic device UE1 using the B-MIMO Mode A communication protocol together with servicing the uplink communicating with the at least one electronic device UE2, UE3 of a plurality of electronic devices other than the first electronic device UE1 using the MIMO communication protocol.

The network node may determine the undesirability to service the uplink communication between the network node and the first electronic device using the B-MIMO Mode A communication protocol in accordance with the quantity of the plurality of electronic devices other than the first electronic device exceeding a predetermined threshold quantity, for example.

In an example embodiment, the BS may determine its inability to communicate with the first electronic device UE1 using the B-MIMO Mode A communication protocol by determining a communication processing burden of the BS communicating using the B-MIMO Mode A communication protocol with the first electronic device UE1 and with the at least one electronic device other than the first electronic device UE1 exceeding a communication processing capacity of the BS.

Based on the BS determining the B-MIMO Mode A capability of the first electronic device UE1 and the determining by the network node BS the undesirability and/or inability of the network node BS to service the uplink communication between the network node BS and the first electronic device UE1 using the B-MIMO Mode A communication protocol, the network node BS transmits a second B-MIMO communication mode selection command signal to the first electronic device UE1 for controlling the B-MIMO mode of communication between the network node BS and the first electronic device UE1. In the example embodiment, the second B-MIMO communication mode selection command signal specifies that the first electronic device UE1 is to use the B-MIMO Mode B communication protocol. The network node BS then may communicate with the first electronic device UE1 using the B-MIMO Mode B communication protocol.

The BS may selectively determine the undesirability and/or inability of the network node BS to communicate with the first electronic device UE1 using the B-MIMO Mode A communication protocol by one or more of determining the undesirability and/or inability based on beam distribution and/or determining the undesirability and/or inability based on performance or load processing capability. The BS may determine the undesirability and/or inability based on beam distribution by determining a distribution of the at least one electronic device UE2, UE3 of a plurality of electronic devices other than the first electronic device UE1 over communication beams of the network node BS, determining a beam distribution servicing overhead of communicating with the network node BS using the B-MIMO Mode A communication protocol together with the communication with the quantity of electronic devices UE2, UE3 other than the first electronic device UE1 using the MIMO communication protocol and, determining by the network node BS the beam distribution servicing overhead being greater than a predetermined overhead threshold.

The BS may determine the undesirability and/or inability based on performance or load processing capability by determining a communication processing capacity of the network node BS exceeding a communication processing burden of the network node BS communicating using the B-MIMO Mode A communication protocol with the first electronic device UE1 and with the at least one electronic device UE2, UE3 other than the first electronic device UE1 using the MIMO communication protocol.

The BS may selectively determine the undesirability and/or inability of the network node BS to communicate with the first electronic device UE1 using the B-MIMO Mode A communication protocol by determining a condition of one or more communication channels used for the communicating by the network node BS with the at least one electronic device UE2, UE3 of a plurality of electronic devices other than the first electronic device UE1 using the MIMO communication protocol, and selectively determining the undesirability and/or inability of the network node BS to communicate with the first electronic device UE1 using the B-MIMO Mode A communication protocol based on the condition of the one or more communication channels.

UE Broadcasts Mode A Capability, Joins in Mode B

In the embodiment shown in FIG. 6, the network node or base station BS may already be communicating with a plurality of electronic devices UE1, UE3 other than a first electronic device UE2 using a Beam MIMO Mode A communication protocol. The BS may receive from the first electronic device UE1 a first communication capabilities signal, the first communication capabilities signal specifying a B-MIMO communication mode capability of the first electronic device UE1 as a B-MIMO Mode A capability for communicating by the first electronic device UE1 with the network node BS using the B-MIMO Mode A communication protocol or as a B-MIMO Mode B capability for communicating by the first electronic device UE1 with the network node BS using a B-MIMO Mode B communication protocol. The network node BS determines the B-MIMO Mode A capability of the first electronic device UE1 based on the B-MIMO communication mode capability specified by the first communication capabilities signal. Responsive to determining the B-MIMO Mode A capability of the first electronic device UE1, the network node BS selectively determines an inability of the network node BS to service the uplink communication between the network node BS and the first electronic device UE1 using the B-MIMO Mode A communication protocol together with servicing the uplink communicating with the at least one electronic device UE2, UE3 of the plurality of electronic devices other than the first electronic device UE1 using the B-MIMO Mode A communication protocol. Based on the determining by the network node BS the B-MIMO Mode A capability of the first electronic device UE1 and the determining by the network node BS the inability of the network node BS to service the uplink communication between the network node BS and the first electronic device UE1 using the B-MIMO Mode A communication protocol, the network node BS transmits a second B-MIMO communication mode selection command signal to the first electronic device UE1 for controlling the B-MIMO mode of communication between the network node BS and the first electronic device UE1, the second B-MIMO communication mode selection command signal specifying that the first electronic device UE1 use the B-MIMO Mode B communication protocol.

Thereafter, the BS may communicate using the Beam MIMO Mode B communication protocol with the first electronic device UE1 and may use the B-MIMO Mode A with the plurality of electronic devices UE2, UE3 other than the first electronic device UE1.

In an example embodiment, the BS may determine its inability to communicate with the first electronic device UE1 using the B-MIMO Mode A communication protocol by: determining a quantity of electronic devices other than the first electronic device UE1 communicating with the BS using the B-MIMO Mode A communication protocol, determining a threshold number of electronic devices permitted to communicate with the BS using the B-MIMO Mode A communication protocol, and determining its inability to communicate with the first electronic device UE1 using the B-MIMO Mode A communication protocol in accordance with a sum of the first electronic device UE1 together with the quantity of electronic devices other than the first electronic device UE1 communicating with the BS using the B-MIMO Mode A communication protocol being greater than the threshold number of electronic devices permitted to communicate with the BS using the B-MIMO Mode A communication protocol.

In an example embodiment, the BS may determine its inability to communicate with the first electronic device UE1 using the B-MIMO Mode A communication protocol by determining a communication processing burden of the BS communicating using the B-MIMO Mode A communication protocol with the first electronic device UE1 and with the at least one electronic device other than the first electronic device UE1 exceeding a communication processing capacity of the BS.

The network node may determine the undesirability to service the uplink communication between the network node and the first electronic device using the B-MIMO Mode A communication protocol in accordance with the quantity of the plurality of electronic devices other than the first electronic device exceeding a predetermined threshold quantity, for example.

In an example embodiment, the BS may determine its inability to communicate with the first electronic device UE1 using the B-MIMO Mode A communication protocol by determining a quantity of electronic devices other than the first electronic device UE1 communicating with the BS using the B-MIMO Mode A communication protocol, determining a threshold number of electronic devices permitted to communicate with the BS using the B-MIMO Mode A communication protocol, and determining the ability of the BS to communicate with the first electronic device UE1 using the B-MIMO Mode A communication protocol in accordance with a sum of the first electronic device UE1 together with the quantity of electronic devices other than the first electronic device UE1 communicating with the BS using the B-MIMO Mode A communication protocol being less than or equal to the threshold number of electronic devices permitted to communicate with the BS using the B-MIMO Mode A communication protocol.

UE Broadcasts Mode A Request, Joins in Mode B

In the embodiment as further shown in FIG. 6, the network node or base station BS may already be communicating with a plurality of electronic devices UE1, UE3 other than a first electronic device UE2 using a Beam MIMO Mode A communication protocol. The BS may receive a first communication request signal from the electronic device UE2, the first communication request signal specifying a communication mode selection request indicating a request for communicating by the electronic device UE2 with the network node BS and a preference by the electronic device UE2 to use the Beam MIMO Mode A communication protocol over or relative to a Beam MIMO Mode B communication protocol. The network node BS may selectively transmit a second communication grant signal from the network node BS to the electronic device UE2 in accordance with an inability of the network node BS to communicate with the electronic device UE2 using the Beam MIMO Mode A communication protocol. The second grant signal specifies a communication mode selection indicating a denial by the network node BS to the electronic device UE2 for the electronic device UE2 to communicate with the network node BS using the Beam MIMO Mode A communication protocol. Instead, the second grant signal grants by the network node BS to the electronic device UE2 for the electronic device UE2 to communicate with the network node BS using a Beam MIMO Mode B communication protocol.

Thereafter, the network node BS of the communication network 600 may communicate with the electronic device UE2 using the Beam MIMO Mode B communication protocol, and may communicate with the plurality of electronic devices UE1 and UE3 other than the electronic device UE2 using the Beam MIMO Mode A communication protocol.

In accordance with an example embodiment, the BS may determine the inability of the network node BS to efficiently communicate with the electronic device UE2 using the Beam MIMO Mode A communication protocol by determining by the network node BS a quantity of electronic devices (two (2) in the embodiment of FIG. 6: UE1 and UE2) other than the electronic device UE2 communicating with the network node BS using the Beam MIMO Mode A communication protocol; determining by the network node BS a threshold number of electronic devices permitted to communicate with the network node BS using the Beam MIMO Mode A communication protocol (which threshold number may be two (2) for example); and determining by the network node BS the inability of the network node BS to communicate with the electronic device UE2 using the Beam MIMO Mode A communication protocol in accordance with a sum (three (3) in this example of the electronic device UE2 (one (1) in this example) together with the quantity (two (2) in this example) of electronic devices UE1, UE2 other than the electronic device UE2 communicating with the network node BS using the Beam MIMO Mode A communication protocol being greater than the threshold number (two (2) in this example) of electronic devices permitted to communicate with the network node BS using the Beam MIMO Mode A communication protocol.

In accordance with a further example embodiment, the BS may determine the inability of the network node BS to communicate with the electronic device UE2 using the Beam MIMO Mode A communication protocol by determining a communication processing capacity of the network node BS exceeding a communication processing burden of the network node BS communicating using the Beam MIMO Mode A communication protocol with the electronic device UE2 and together with the electronic devices UE1, UE3 other than the electronic device UE2.

Procedures for Selecting MIMO Mode

Figure 7:
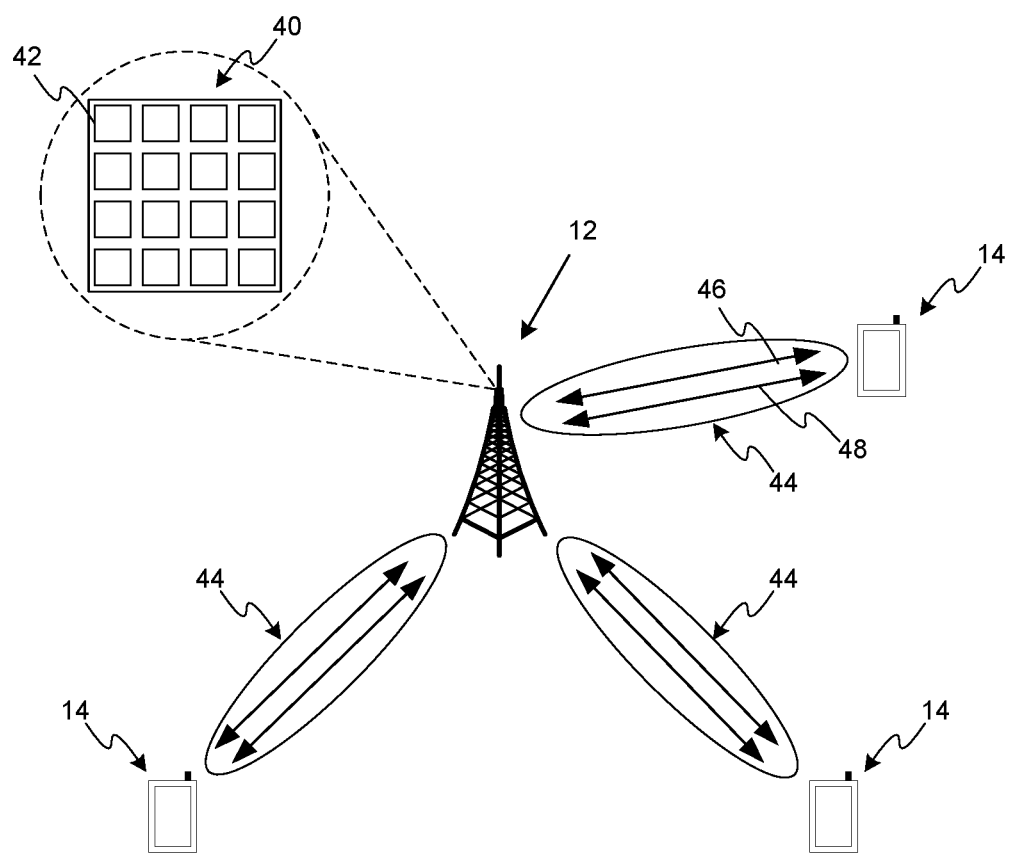
FIG. 7 is a schematic diagram of the network system of FIG. 1 according to an aspect.

With reference to FIG. 7, network system 10 may support multi-beam operations. Base station 12 may include a large antenna array 40 comprising individual antenna elements 42. In an aspect, each antenna element 42 may be coupled to a respective radio chain of base station 12. The base station 12 may use beam forming technique with the antenna array 40 to generate a plurality of transmit beams 44 directed to electronic devices 14. In certain embodiments, base station 12 may have the capabilities to operate as a polarization based MIMO (P-MIMO) system in which the transmit beams 44 are dual polarized signals. More specifically, the individual beams 46 and 48 of a beam pair in a P-MIMO system can have orthogonal polarizations with respect to one another. For example, if beam pair 44 is transmitted in a P-MIMO system, first beam 46 is transmitted in the same direction, but with a polarization that is orthogonal to the polarization of second beam 48.

In order to effectively communicate between the base station 12 and the set of user equipment devices 14, the B-MIMO Mode A communication protocol is preferred. However and as described above, he base station 12 may determine that the B-MIMO Mode A processing burden is too great wherein thereafter any further user equipment devices 14 seeking to join the communication network and being B-MIMO Mode A capable will be denied and instead required to use B-MIMO Mode B configuration. Further, any one or more of the electronic devices 14 can request the B-MIMO Mode B but, since Mode A is almost always preferred the electronic devices likely will request the Mode A. In certain circumstances, however, an electronic device may only be capable of B-MIMO Mode B communication so that device will naturally only be able to lodge that request with the base station 12 for communication participation in the network.

Figure 8:
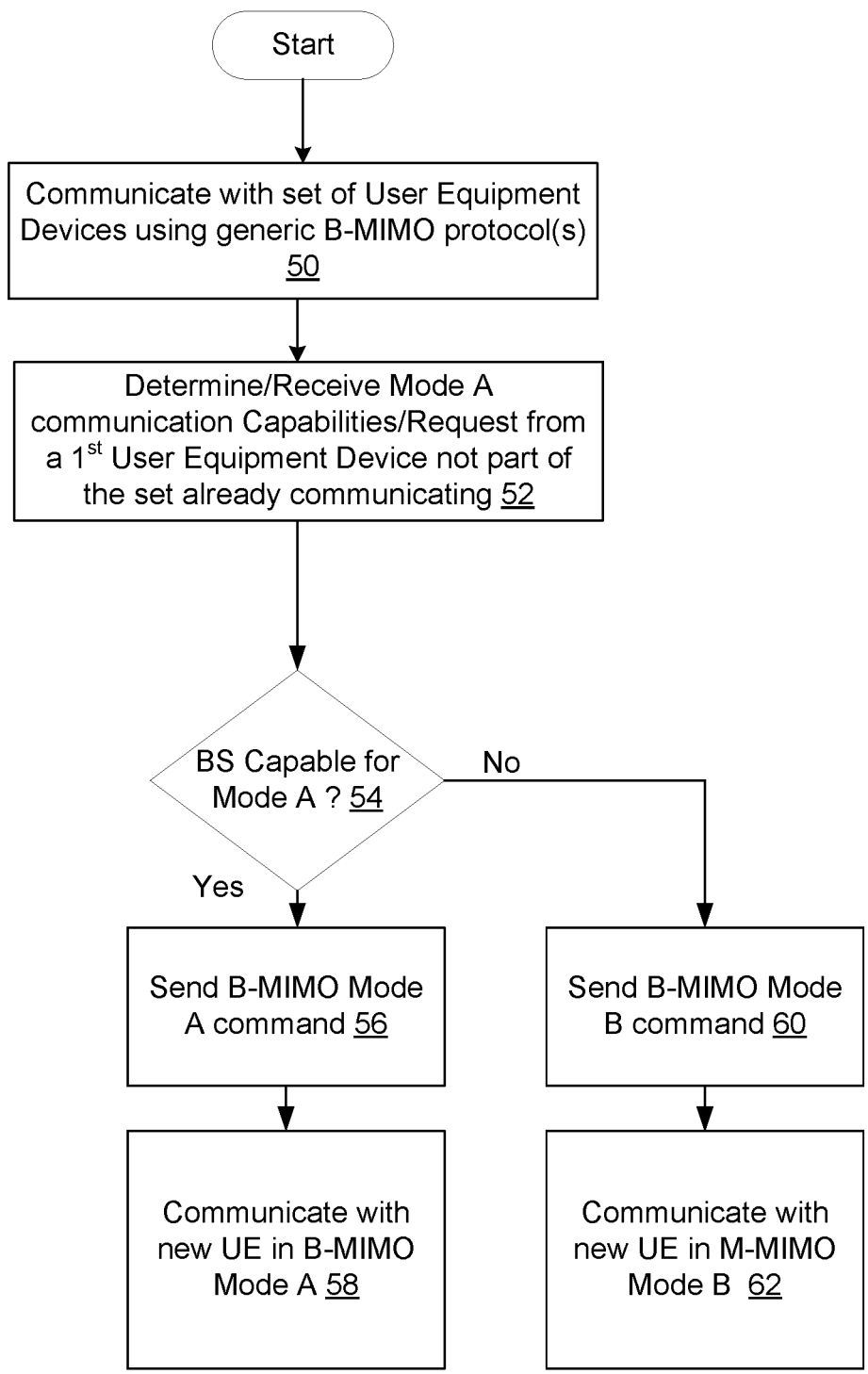
FIG. 8 is a flowchart of a method according to various example embodiments.

With reference to FIG. 8, shown is an exemplary flow diagram representing steps that may be carried out by the base station 12 when executing logical instructions to carry out MIMO mode A/B selection for communication with a user equipment device seeking to newly join a communication network. Although illustrated in a logical progression, the blocks of FIG. 8 may be carried out in other orders and/or with concurrence between two or more blocks. Therefore, the illustrated flow diagrams may be altered (including omitting steps or adding steps not shown in order to enhance description of certain aspects) and/or may be implemented in an object-oriented manner or in a state-oriented manner.

For convenience of discussion and ease of description, the example embodiments will be described in connection with control of B-MIMO Modes of communication. It is to be appreciated however that the embodiments are not limited to control of only Beam MIMO, or of only Polarization MIMO, but rather apply equivalently to any other forms of multiple input multiple output communication protocols now know or hereinafter developed. Beginning at block 50, the network node (12) communicates with a plurality of electronic devices (UE1 and UE3) other than an electronic device (UE2) using one or more generic MIMO communication protocol(s). The MIMO communication mode of the plurality of electronic devices (UE1 and UE3) other than an electronic device (UE2) may be any arbitrary communication mode such as for example P-MIMO Mode A, P-MIMO Mode B, B-MIMO Mode A, and/or B-MIMO Mode B.

At block 52, the network node (12) in accordance with an embodiment determines a B-MIMO Mode A capability of the user equipment device UE2. In accordance with the embodiment, the network node may determine the B-MIMO Mode A capability of the first electronic device by determining a manufacturer brand of the first electronic device. In further addition and/or alternatively, the network node may determine the B-MIMO Mode A capability of the first electronic device by determining a manufacturer-assigned model number of the first electronic device. In still further addition and/or alternatively, the network node may determine the B-MIMO Mode A capability of the first electronic device by determining a manufacturer-assigned release specification of the first electronic device. In still yet further addition and/or alternatively, the network node may determine the B-MIMO Mode A capability of the first electronic device by determining a default support capability of the first electronic device.

At block 52, the network node (12) in accordance with a further embodiment receives a first signal from the electronic device (UE2). In accordance with the example embodiment, the signal received from the electronic device (UE2) is a communication capabilities signal specifying a B-MIMO communication mode capability of the electronic device UE2 as a B-MIMO Mode A capability for communicating by the electronic device UE2 with the network node BS using the B-MIMO Mode A communication protocol or as a B-MIMO Mode B capability for communicating by the electronic device UE2 with the network node BS using a B-MIMO Mode B communication protocol. In accordance with a still further example embodiment, the signal received from the electronic device (UE2) may specify a communication mode selection request indicating a request for communicating by the electronic device (UE2) with the network node (12) and a preference by the electronic device (UE2) to use the B-MIMO Mode A communication protocol over/relative to a B-MIMO Mode B communication protocol.

A decision is made at block 54 on whether the electronic device UE2 is capable of B-MIMNO Mode A communication and whether the network node can support communication with the electronic device UE2.

The network node (12) selectively transmits at block 56 a first communication command signal from the network node (12) to the electronic device (UE2) in accordance with an ability and/or desirability of the network node (12) to communicate with the electronic device (UE2) using the B-MIMO Mode A communication protocol. In the example embodiment, the first communication command signal specifies a communication mode selection indicating a command by the network node (12) to the electronic device (UE2) for the electronic device (UE2) to communicate with the network node (12) using the B-MIMO Mode A communication protocol.

In block 58 the network node (12) communicates with the electronic device (UE2) by using the B-MIMO Mode A communication protocol and communicates with the plurality of electronic devices other than the electronic device (UE2) by using the one or more generic MIMO communication protocol(s).

The network node (12) selectively transmits at block 60 a second communication mode select signal to the electronic device (UE2) in accordance with an inability and/or an undesirability of the network node (12) to communicate with the electronic device (UE2) using the B-MIMO Mode A communication protocol. In the example embodiment, the second communication mode selection command signal transmitted to the first electronic device (14) controls the B-MIMO mode of communication between the network node (12) and the first electronic device. The second communication mode selection command signal specifies that the first electronic device is to use the B-MIMO Mode B communication protocol.

In a further embodiment, the second communication mode select signal may be a de-rated grant signal specifying a communication mode selection de-rated grant indicating a denial by the network node (12) to a Mode A requesting electronic device (UE2) for the electronic device (UE2) to communicate with the network node (12) using the B-MIMO Mode A communication protocol, and a grant by the network node (12) to the electronic device (UE2) for the electronic device (UE2) to communicate with the network node (12) using a B-MIMO Mode B communication protocol.

In block 62 the network node (12) communicates with the electronic device (UE2) using the B-MIMO Mode B communication protocol, and communicates with the plurality of electronic devices (UE1 and UE3) other than the electronic device (UE2) using the one or more generic MIMO communication protocol(s).

CONCLUSION

Although certain embodiments have been shown and described, it is understood that equivalents and modifications falling within the scope of the appended claims will occur to others who are skilled in the art upon the reading and understanding of this specification.

What is claimed is:

1. A method of controlling a Multiple Input Multiple Output (MIMO) Mode of uplink communication between a network node and a first electronic device, the method comprising:
communicating by the network node with at least one electronic device of a plurality of electronic devices other than the first electronic device using an uplink MIMO communication protocol;
determining by the network node a MIMO Mode A capability of the first electronic device;
responsive to determining the MIMO Mode A capability of the first electronic device, selectively determining by the network node a desirability of the network node to service an uplink communication between the network node and the first electronic device using a MIMO Mode A communication protocol together with servicing the uplink communicating with the at least one electronic device of the plurality of electronic devices other than the first electronic device using the uplink MIMO communication protocol;
based on the determining by the network node the MIMO Mode A capability of the first electronic device and the determining by the network node the desirability of the network node to service the uplink communication between the network node and the first electronic device using the MIMO Mode A communication protocol, transmitting by the network nod a first uplink MIMO communication mode selection command signal to the first electronic device for controlling a MIMO mode of uplink communication between the network node and the first electronic device, the first uplink MIMO communication mode selection command signal specifying that the first electronic device use the uplink MIMO Mode A communication protocol; and
communicating by the network node with the first electronic device using the uplink MIMO Mode A communication protocol.

2. The method according to claim 1, wherein the determining by the network node the MIMO Mode A capability of the first electronic device comprises one or more of:
determining the MIMO Mode A capability of the first electronic device by:
receiving by the network node from the first electronic device a first communication capabilities signal, the first communication capabilities signal being communicated between the first electronic device and the network node on a selected dedicated communication channel between the first electronic device and the network node, and the first communication capabilities signal specifying a MIMO communication mode capability of the first electronic device as the MIMO Mode A capability for uplink communicating by the first electronic device with the network node using the MIMO Mode A communication protocol or as a MIMO Mode B capability for uplink communicating by the first electronic device with the network node using a MIMO Mode B communication protocol; and
determining by the network node the MIMO Mode A capability of the first electronic device based on the MIMO communication mode capability specified by the first communication capabilities signal;
determining the MIMO Mode A capability of the first electronic device by determining a manufacturer brand of the first electronic device;
determining the MIMO Mode A capability of the first electronic device by determining a manufacturer assigned model number of the first electronic device;
determining the MIMO Mode A capability of the first electronic device by determining a manufacturer assigned release specification of the first electronic device; and/or determining the MIMO Mode A capability of the first electronic device by determining a default support capability of the first electronic device.

3. The method according to claim 1, further comprising:
responsive to determining the MIMO Mode A capability of the first electronic device, determining by the network node an undesirability of the network node to service the uplink communication between the network node and the first electronic device using the uplink MIMO Mode A communication protocol in accordance with a quantity of the plurality of electronic devices other than the first electronic device exceeding a predetermined threshold quantity;

based on the determining by the network node the MIMO Mode A capability of the first electronic device and the determining by the network node the undesirability of the network node to service the uplink communication between the network node and the first electronic device using the uplink MIMO Mode A communication protocol, transmitting by the network node a second uplink MIMO communication mode selection command signal to the first electronic device for controlling the MIMO mode of uplink communication between the network node and the first electronic device, the second uplink MIMO communication mode selection command signal specifying that the first electronic device use an uplink MIMO Mode B communication protocol; and communicating by the network node with the first electronic device using the uplink MIMO Mode B communication protocol.

4. The method according to claim 1, wherein the selectively determining the desirability of the network node to communicate with the first electronic device using the uplink MIMO Mode A communication protocol comprises one or more of:
determining the desirability based on beam distribution by:
determining by the network node a distribution of the at least one electronic device of the plurality of electronic devices other than the first electronic device over communication beams of the network node;
determining by the network node a beam distribution servicing overhead of communicating with the network node using the uplink MIMO Mode A communication protocol together with the communication with the plurality of electronic devices other than the first electronic device using the uplink MIMO communication protocol; and
determining by the network node the beam distribution servicing overhead being less than a predetermined overhead threshold; and/or
determining the desirability based on performance or load processing capability by:
determining by the network node an uplink communication processing capacity of the network node not exceeding a communication processing burden of the network node communicating using the uplink MIMO Mode A communication protocol with the first electronic device and with the at least one electronic device other than the first electronic device using the uplink MIMO communication protocol.

5. The method according to claim 1, wherein the selectively determining the desirability of the network node to communicate with the first electronic device using the uplink MIMO Mode A communication protocol comprises:
determining by the network node a condition of one or more uplink communication channels used for the communicating by the network node with the at least one electronic device of the plurality of electronic devices other than the first electronic device using the uplink MIMO communication protocol; and
selectively determining the desirability of the network node to uplink communicate with the first electronic device using the uplink MIMO Mode A communication protocol based on the condition of the one or more uplink communication channels.

6. A network node operable to control a Beam Multiple Input Multiple Output (MIMO) Mode of communication over a communication channel between a network node and a first electronic device, the network node comprising:
an antenna arrangement, and
a control circuit comprising a processor and a memory, the control circuit being operably coupled with the antenna arrangement, the control circuit being operable to:
communicate with at least one electronic device of a plurality of electronic devices other than the first electronic device using an uplink MIMO communication protocol;
determine a MIMO Mode A capability of the first electronic device;
responsive to determining the MIMO Mode A capability of the first electronic device, selectively determine a desirability of the network node to service an uplink communication between the network node and the first electronic device using a MIMO Mode A communication protocol together with servicing the uplink communicating with the at least one electronic device of the plurality of electronic devices other than the first electronic device using the uplink MIMO communication protocol;
based on the determining the MIMO Mode A capability of the first electronic device and the determining the desirability of the network node to service the uplink communication between the network node and the first electronic device using the MIMO Mode A communication protocol, transmit via the antenna arrangement a first uplink MIMO communication mode selection command signal to the first electronic device for controlling a MIMO mode of uplink communication between the network node and the first electronic device, the first uplink MIMO communication mode selection command signal specifying that the first electronic device use the uplink MIMO Mode A communication protocol; and
communicating via the antenna arrangement by the network node with the first electronic device using the uplink MIMO Mode A communication protocol.

7. The network node according to claim 6, wherein the control circuit is further operable to determine the MIMO Mode A capability of the first electronic device by one or more of:
determining the MIMO Mode A capability of the first electronic device by:
receiving from the first electronic device a first communication capabilities signal, the first communication capabilities signal being communicated between the first electronic device and the network node on a selected dedicated communication channel between the first electronic device and the network node, and the first communication capabilities signal specifying a MIMO communication mode capability of the first electronic device as the MIMO Mode A capability for uplink communicating by the first electronic device with the network node using the MIMO Mode A communication protocol or as a MIMO Mode B capability for uplink communicating by the first electronic device with the network node using a MIMO Mode B communication protocol; and determining the MIMO Mode A capability of the first electronic device based on the MIMO communication mode capability specified by the first communication capabilities signal;

determining the MIMO Mode A capability of the first electronic device by determining a manufacturer brand of the first electronic device;

determining the MIMO Mode A capability of the first electronic device by determining a manufacturer assigned model number of the first electronic device;

determining the MIMO Mode A capability of the first electronic device by determining a manufacturer assigned release specification of the first electronic device; and/or determining the MIMO Mode A capability of the first electronic device by determining a default support capability of the first electronic device.

8. The network node according to claim 6, wherein the control circuit is further operable to:

responsive to determining the MIMO Mode A capability of the first electronic device, determine an undesirability of the network node to service the uplink communication between the network node and the first electronic device using the uplink MIMO Mode A communication protocol in accordance with a quantity of the plurality of electronic devices other than the first electronic device exceeding a predetermined threshold quantity;

based on the determining by the network node the MIMO Mode A capability of the first electronic device and the determining by the network node the undesirability of the network node to service the uplink communication between the network node and the first electronic device using the uplink MIMO Mode A communication protocol, transmit via the antenna arrangement a second uplink MIMO communication mode selection command signal to the first electronic device for controlling the MIMO mode of uplink communication between the network node and the first electronic device, the second uplink MIMO communication mode selection command signal specifying that the first electronic device use an uplink MIMO Mode B communication protocol; and communicate via the antenna arrangement with the first electronic device using the uplink MIMO Mode B communication protocol.

9. The network node according to claim 6, wherein the control circuit is further operable to selectively determine the desirability of the network node to communicate with the first electronic device using the uplink MIMO Mode A communication protocol by one or more of:

determine the desirability based on beam distribution by:
determining a distribution of the at least one electronic device of the plurality of electronic devices other than the first electronic device over communication beams of the network node;
determining a beam distribution servicing overhead of communicating with the network node using the uplink MIMO Mode A communication protocol together with the communication with the plurality of electronic devices other than the first electronic device using the uplink MIMO communication protocol; and
determine the beam distribution servicing overhead being less than a predetermined overhead threshold; and/or determine the desirability based on performance or load processing capability by:
determining an uplink communication processing capacity of the network node not exceeding a communication processing burden of the network node communicating using the uplink MIMO Mode A communication protocol with the first electronic device and with the at least one electronic device other than the first electronic device using the uplink MIMO communication protocol.

10. The network node according to claim 6, wherein the control circuit is further operable to selectively determine the desirability of the network node to communicate with the first electronic device using the uplink MIMO Mode A communication protocol by:

determine an inability of the network node to communicate with the first electronic device using the MIMO Mode A communication protocol by:
determining a condition of one or more uplink communication channels used for the communicating by the network node with the at least one electronic device of the plurality of electronic devices other than the first electronic device using the uplink MIMO communication protocol; and
selectively determining the desirability of the network node to uplink communicate with the first electronic device using the uplink MIMO Mode A communication protocol based on the condition of the one or more uplink communication channels.

* * * * *